United States Patent [19]

Barnes et al.

[11] Patent Number: 4,631,588
[45] Date of Patent: Dec. 23, 1986

[54] APPARATUS AND ITS METHOD FOR THE SIMULTANEOUS PRESENTATION OF COMPUTER GENERATED GRAPHICS AND TELEVISION VIDEO SIGNALS

[75] Inventors: Lawrence C. Barnes, Apopka; Robert G. Mankedick, Longwood, both of Fla.

[73] Assignee: NCR Corporation, Dayton, Ohio

[21] Appl. No.: 700,568

[22] Filed: Feb. 11, 1985

[51] Int. Cl.$^4$ ............................................. H04N 5/04
[52] U.S. Cl. ...................................... 358/149; 358/22
[58] Field of Search .................. 358/22, 181, 148–151; 340/721, 725, 734, 814

[56] References Cited

U.S. PATENT DOCUMENTS

| | | | |
|---|---|---|---|
| 3,588,351 | 6/1971 | Baun | 358/150 |
| 4,319,278 | 3/1982 | Shimizu | 358/148 |
| 4,346,407 | 8/1982 | Baer et al. | 358/149 |
| 4,409,626 | 10/1983 | Ferguson et al. | 358/148 |
| 4,425,581 | 1/1984 | Schweppe et al. | 358/148 |
| 4,498,098 | 2/1985 | Stell . | |
| 4,531,154 | 7/1985 | Hallock | 358/148 |
| 4,554,582 | 11/1985 | Wine | 358/149 |

Primary Examiner—Jin F. Ng
Attorney, Agent, or Firm—Wilbert Hawk, Jr.; Edward Dugas; Floyd A. Gonzalez

[57] ABSTRACT

An apparatus, and its method, for overlaying a computer display on a video signal, having a video signal receiving circuit, a sync strip circuit connected to said video signal receiving circuit for stripping the sync pulses from the video signal, and a display control circuit for generating display control pulses. A phase locked loop circuit is provided for locking the display control pulses in phase with sync pulses stripped from the video signal when the video signal is present, and for controlling the display control means to generate display control pulses at a selected rate when the video signal is absent. A vertical drive pulse generating circuit generates vertical drive pulses in phase with selected ones of the sync pulses stripped from the video signal when the video signal is present, and generates vertical drive pulses after a set number of generated display control pulses when the video signal is absent. A computer display generator circuit generates computer display signals under the control of the display control pulses and the vertical drive pulses. A combining circuit combines the video signal with the generated computer display signals when the video signal is present, and blocks the subsequent combining of later received video signals with the generated computer display signals for a set time when the video signal is absent, allowing the phase locked loop circuit to lock the display control pulses in phase with the sync pulses of the reestablished, later received video signals.

19 Claims, 26 Drawing Figures

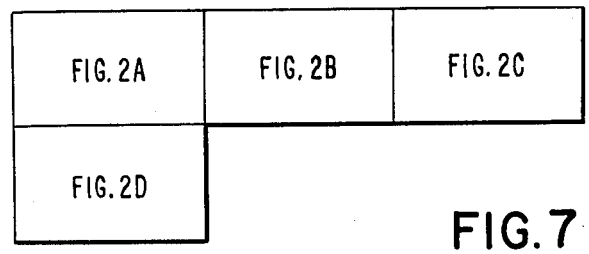
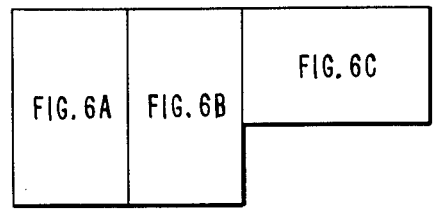
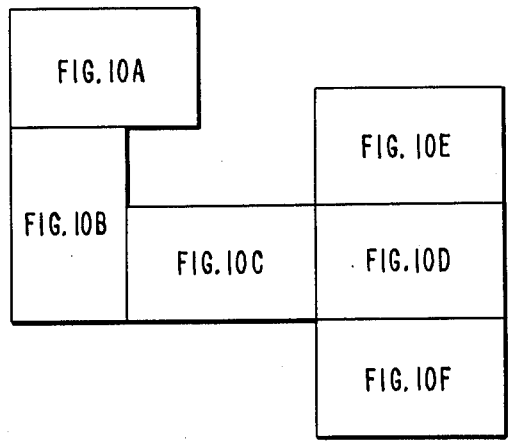
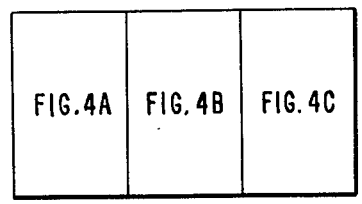
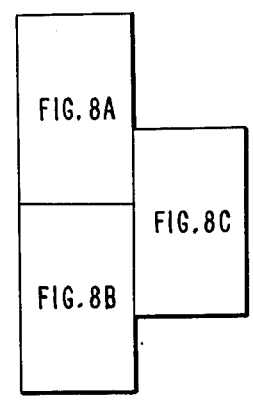

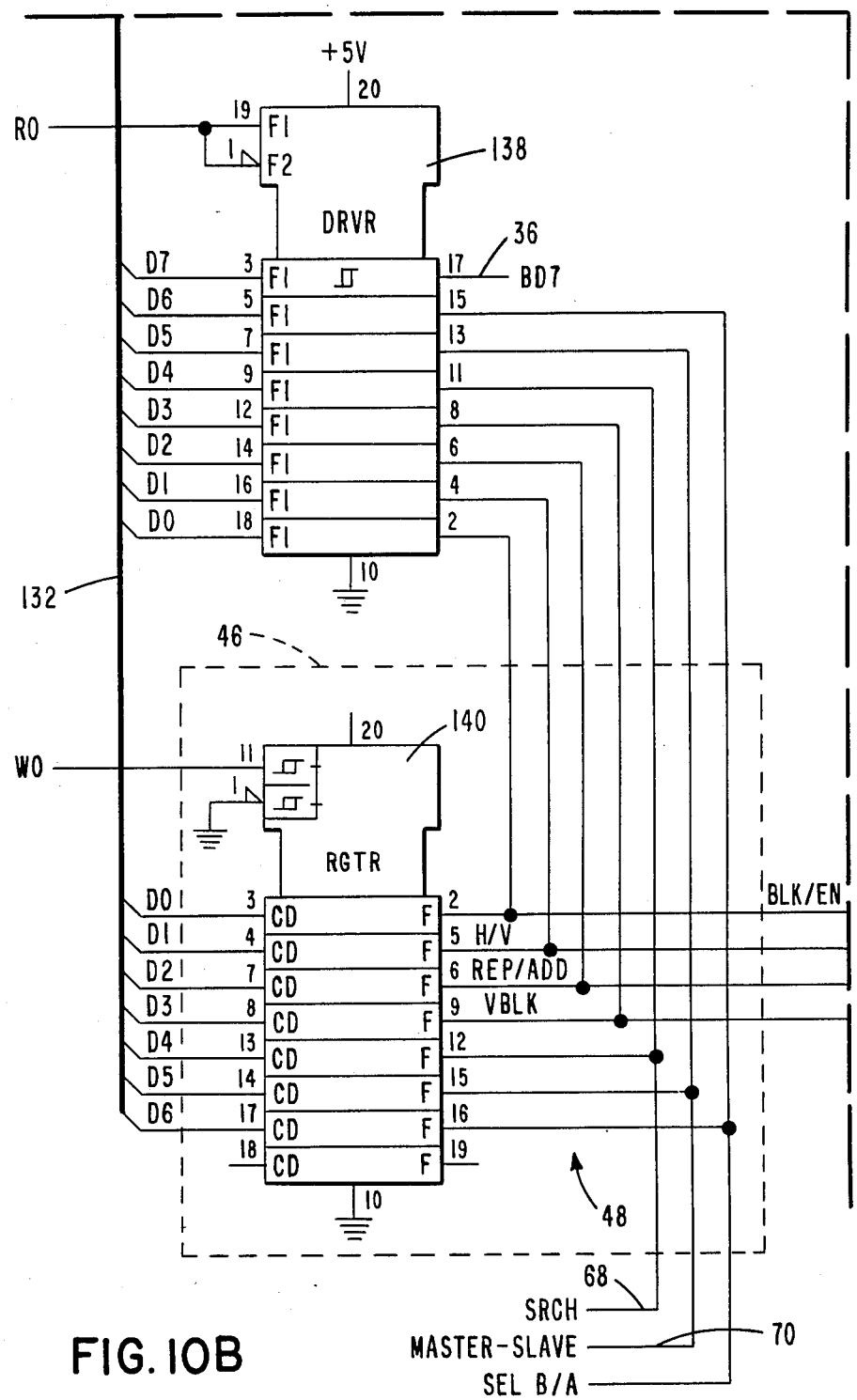
FIG. IOB

APPARATUS AND ITS METHOD FOR THE SIMULTANEOUS PRESENTATION OF COMPUTER GENERATED GRAPHICS AND TELEVISION VIDEO SIGNALS

BACKGROUND OF THE INVENTION

The present invention relates to the simultaneous presentation of two video signals wherein one video signal is designated a master signal to provide sync pulses for the second video signal, and more particularly to an apparatus and its method for continuing the presentation of the second video when the master video signal is lost.

With the present development of the generation of various video signals in a television format, it becomes desirable to display the generated video signal simultaneously with a second video signal, either live or recorded. The second video signal may be a computer generated graphics display which may include alphanumeric characters.

Systems are known for superimposing symbols on a video signal for display on a television monitor. In many of these systems, characters to be displayed, such as closed captioned characters, are transmitted with the TV signal during the blanking portion of the signal.

In other systems, digital signals, such as channel numbers or time-of-day displays, are superimposed over the video display as desired. Character generators are also known which overlay captions on a television signal.

Systems are also known in which computer generated graphics signals are overlaid over a TV video signal. Some of these systems employ phase locked loop circuits for locking the clock of the computer onto the TV video signal. Others are known in which the computer clock is the master which controls the display of the TV video signal. U.S. Pat. No. 4,425,581 issued Jan. 10, 1984 to Schweppe et al. discloses a system in which a computer generated video signal is overlaid on an NTSC video signal by use of horizontal and vertical pulse processor circuits to generate a horizontal start signal and a vertical reset signal. Separate column, line and row registers are used which are under the control of the horizontal start and vertical reset signals for enabling individual scan lines of the computer video signal to commence as desired;

Other patents of interest are:
U.S. Pat. No. 3,499,979 issued Mar. 10, 1970;
U.S. Pat. No. 3,584,142 issued June 8, 1971;
U.S. Pat. No. 3,731,282 issued May 1, 1973;
U.S. Pat. No. 3,891,792 issued June 24, 1975;
U.S. Pat. No. 3,898,644 issued Aug. 5, 1975;
U.S. Pat. No. 4,040,088 issued Aug. 2, 1977;
U.S. Pat. No. 4,051,532 issued Sept. 27, 1977;
U.S. Pat. No. 4,117,511 issued Sept. 26, 1978;
U.S. Pat. No. 4,305,131 issued Dec. 8, 1981;
U.S. Pat. No. 4,396,944 issued Aug. 2, 1983; and
U.S. Pat. No. 4,475,164 issued Oct. 2, 1984.

SUMMARY OF THE INVENTION

The present invention includes a video terminal for receiving a video signal, either recorded or live, in a standard television format, and a phase locked loop for generating horizontal sync pulses for use by a cathode ray tube controller circuit for displaying a computer generated graphics signal. The video signal and the computer generated graphics signal are mixed for simultaneous display on a television monitor.

Vertical sync pulses are regenerated from the vertical sync pulses in the video signal for use by the cathode ray tube circuit controller and the television monitor. If the video signal is lost, the generated horizontal sync pulses are locked at a set frequency, and a counter counts from the last vertical sync pulse received from the video signal to generate subsequent vertical sync pulses. The computer issues control signals which block out the video signal until the video signal has been reestablished and the phase locked loop has once again locked the generated horizontal sync pulses in phase with the reestablished video signal sync pulses.

In a system for overlaying a computer display on a video signal, one embodiment of the apparatus for generating vertical sync pulses includes a video input circuit for receiving a video signal including sync pulses, a separating circuit for separating horizontal sync pulses and vertical pulses from the sync pulses of the video signal received by the video input circuit, and a computer graphics sync pulse generating circuit for generating computer graphics sync pulses in phase with the horizontal sync pulses of the separating circuit when a video signal is received by the video input circuit, and for generating computer graphics sync pulses at a set rate when a video signal is not received by the video input circuit. A counter circuit generates vertical sync pulses responsive to vertical sync pulses separated by the separating circuit when a video signal is received by the video input circuit, and generates vertical sync pulses responsive to a set number of generated computer graphics sync pulses counted from the last vertical sync pulse from the separating circuit when a video signal is not received by the video input circuit.

The present invention is particularly useful in a system for receiving video signals, such as from a video disk, and displaying them on a television monitor in an interactive environment with computer generated graphics. For instance, a scene recorded on a video disk may be displayed under computer control on the television monitor. Then based upon instructions in the recorded scene, an operator may enter requests, either by use of a keyboard or a touch screen device or some other computer input device, to display either a new video scene or data from a computer file overlaid on the video scene being displayed. The video scenes and the computer data can thus be changed interactively, depending on the operator's responses. This is especially useful in such applications as a computerized catalog wherein items offered for sale may be shown from recordings on the video disk. Computer generated data for a selected item, such as catalog number, price, number available, colors, etc., may then be interactively displayed overlaid on the video display of the item selected. The invention is also useful in educational applications wherein course material may be shown or reviewed interactively depending upon a student's response to periodic test material embedded in video presentations.

It is therefore a principal object of the present invention to provide an apparatus and its method of overlaying a video signal with a computer generated graphics signal.

It is a further object of the present invention to provide an apparatus and its method of continuing the generation of a computer graphics signal which have been locked to a video signal, even if the video signal is lost.

It is a further object of the present invention to provide an apparatus and its method which, in the case the video signal is lost, regenerates vertical sync pulses for the continued generation of a computer graphics signal, by counting from the last valid vertical sync pulse received from the video signal.

It is another object of the present invention to provide an apparatus in which the computer may optionally command the computer graphics generator to become the master for generating video sync pulses.

These and other objects will become apparent from the description of the preferred embodiment and drawings disclosed herein.

BRIEF DESCRIPTION OF THE DRAWINGS

FIGS. 10A-10F, assembled as shown in FIG. 11, presents a schematic diagram of an operation mode circuit, a video contrast circuit and a mixer circuit of FIG. 1.

DESCRIPTION OF THE PREFERRED EMBODIMENT

Figure 1:
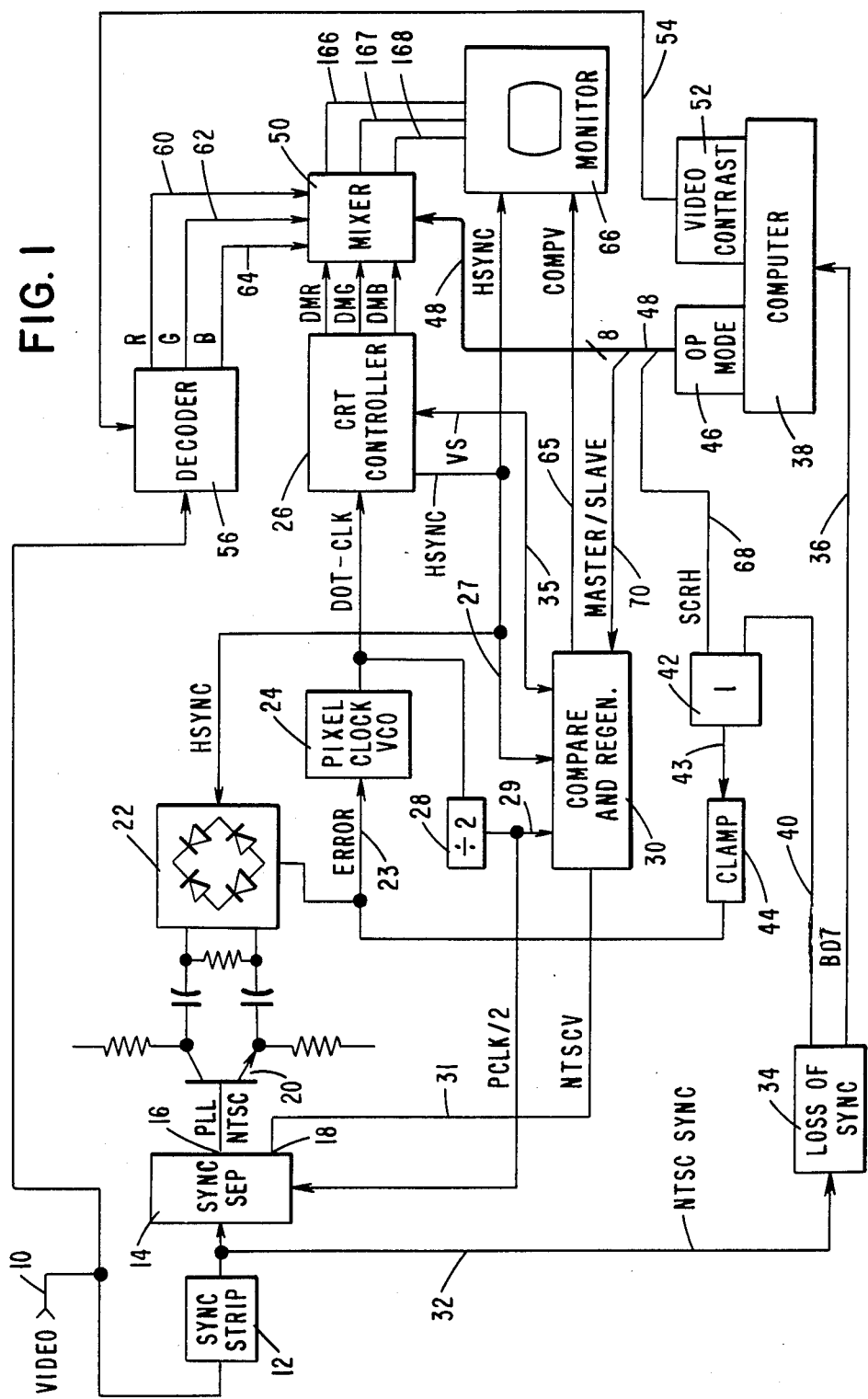
FIG. 1 is a block diagram of a system including the present invention for overlaying video signals with computer graphics signals.

FIG. 1 is a block diagram of a system including the present invention for overlaying video signals with computer graphics signals. A video signal, such as from a video disk, video tape recorder, or other source of video, is received at video input 10, which is connected to the input of a sync strip circuit 12 for stripping the sync pulses from the video signal. The stripped sync pulses (NTSC SYNC) are then inputted to a sync separator circuit 14, which separates the vertical sync pulses (NTSCV) from the NTSC SYNC signal, and conditions the NTSC SYNC pulses to a signal (PLL NTSC) for use by a phase locked loop. The PLL NTSC and the NTSCV signals are placed on the outputs 16 and 18, respectively, of the sync separator circuit 14.

The PLL NTSC signal is placed on the base of a phase splitter transistor 20, which forms pulses inputted into a bridge circuit 22 for comparison to another set of horizontal sync pulses (HSYNC), to be explained. A phase difference in the pulses from the transistor 20, and the HSYNC pulses results in a D.C. error signal (ERROR) outputted by the bridge circuit 22 to a voltage controlled oscillator (VCO) 24 labeled pixel clock VCO.

The output of the pixel clock 24 is a signal labeled DOT-CLK, which is inputted into a cathode ray tube (CRT) controller circuit 26. The DOT-CLK signal outputted by the pixel clock 24 is also inputted to a divided-by-two circuit 28, whose output (PCLK/2) is inputted to the sync separator circuit 14.

The CRT controller circuit 26 operates all of its processing in reference to the DOT-CLK signal, and derives all of its timing from it. The thus derived horizontal sync (HSYNC) signal is fed back into the bridge circuit 22 to close the loop, thereby forming a phase locked loop.

The HSYNC signal on conductor 27, the PCLK/2 signal on conductor 29, and the NTSCV signal on conductor 31, are all fed to the compare and regeneration circuit 30, and used for regenerating a vertical sync (VS) signal on conductor 35 for use by the CRT controller circuit 26, and a composite vertical sync (COMPV) signal on conductor 65 which provides for interleaving of a video signal on a video monitor 66.

The stripped sync signal NTSC SYNC is also inputted over conductor 32 to a loss of sync detector circuit 34. If the loss of sync detector circuit 34 detects a loss of sync, it outputs a signal over conductor 36 to a computer 38, and a signal over conductor 40 to one input of an OR gate 42. The output of the OR gate 42 is connected to a clamp circuit 44. The output of the clamp circuit 44 is connected to the ERROR signal conductor 23, as shown.

The computer 38 may be any one of several personal computers, such as the NCR DM5 or PC4 personal computers available from the NCR Corporation of Dayton, Ohio. The system includes an operation mode circuit 46 for providing data over an eight conductor bus 48 from the computer 38 to a mixer circuit 50, and a video contrast circuit 52 for providing a contrast signal over conductor 54 to a video decoder circuit 56. The decoder circuit 56 receives the video signal from the video input 10, and decodes or demodulates the video signal into its red, green and blue components. The red, green and blue components are then fed by conductors 60, 62 and 64, respectively, into the mixer circuit 50, which mixes them with the red, green and blue components from the CRT controller circuit 26, in accordance with control signals, to be explained later, from the computer 38 received over bus 48. The mixed red, green and blue signals are then inputted from the mixer circuit 50 to a monitor 66. The HSYNC horizontal sync pulses from the CRT controller circuit 26, and COMPV vertical sync pulses from the compare and regenerate circuit 30 are fed into the monitor 66, previously mentioned.

Returning to the operation mode circuit 46, a SCRH signal is outputted over a conductor 68, to the other input of the OR gate 42, and a MASTER/SLAVE signal may be outputted over a conductor 70 to the compare and regeneration circuit 30, to be discussed later.

In operation, video signals to be displayed on monitor 66 are received at video input 10. The video signals are presented to the decoder circuit 56 which demodulates the video signals to their red, green and blue components, and presents them to the mixer circuit 50 over conductors 60, 62 and 64, respectively. Computer graphics signals, to include alphanumeric characters, to be displayed on the monitor 66, are transmitted by the computer 38 to the CRT controller circuit 26 over an internal data bus (not shown). The phase locked loop formed of sync separator circuit 14, transistor 20, bridge circuit 22, pixel clock VCO 24, CRT controller circuit 26, divide-by-two circuit 28, and compare and regeneration circuit 30, locks the derived HSYNC horizontal sync pulses, and regenerated vertical sync (VS) pulses in phase with the sync pulses of the video signals input at video input 10. This provides that the video signals and the computer generated graphics signals are in phase and may be mixed by the mixer circuit 50 for display on the monitor 66.

If the loss of sync detector 34 detects a loss of sync, a lost sync signal is outputted on conductor 36 to the computer 38, and on conductor 40 to the OR gate 42. The lost sync signal on conductor 40 turns on OR gate 42, which activates the clamp circuit 44. The clamp circuit 44 clamps the ERROR signal on conductor 23 to a set D.C. voltage, which locks the output of the pixel clock VCO 24 at a set frequency.

When the computer 38 receives the lost sync signal over conductor 36, it activates the SCRH signal on conductor 68 to hold OR gate 42 on. During the loss of sync condition, the regenerated VS vertical sync pulses, and the composite COMPV vertical. sync pulses are self generated by the circuit 30 by an internal counter, to be explained, which counts from the last detected NTSCV vertical pulse detected.

The computer 38 may optionally set the MASTER/SLAVE signal over conductor 70 to the compare and regeneration circuit 30 such that the computer 38 and its CRT controller circuit 26 becomes the master.

When the video signal is re-established on terminal 10, the loss of sync detector 34 reports this fact over conductor 36 at the computer 38. The computer 38 resets the MASTER/SLAVE signal, if it had been set, on conductor 70, instructing the compare and regeneration circuit 30 and the CRT controller circuit 26 to once again become slave to the sync signals from the video signal. The SCRH signal on conductor 68 is turned off, to turn off OR gate 42, thereby deactivating clamp circuit 44. This allows the phase locked loop described to again lock the HSYNC vertical pulses in phase with the PLL NTSC pulses from terminal 16.

The loss of sync circuit 34 detects the loss of a single horizontal sync pulse in the video signal on terminal 10. Thus it is possible for the video signal to be lost, the pixel clock VCO 24 to be clamped to a set frequency, the compare and regeneration circuit 30 to regenerate VS pulses for the CRT controller 26 and the COMPV pulses for the monitor 66, the video signal on terminal 10 to be re-established, the compare and regeneration circuit 30 to once again regenerate VS pulses from the NTSCV sync pulses, and the frequency of the pixel clock VCO 24 to be adjusted by the phase locked loop to lock the HSYNC horizontal sync pulses in phase with the video sync pulses, all in a single frame displayed on monitor 66 such that the loss of video could not distinguished by the human eye.

Figure 2A:
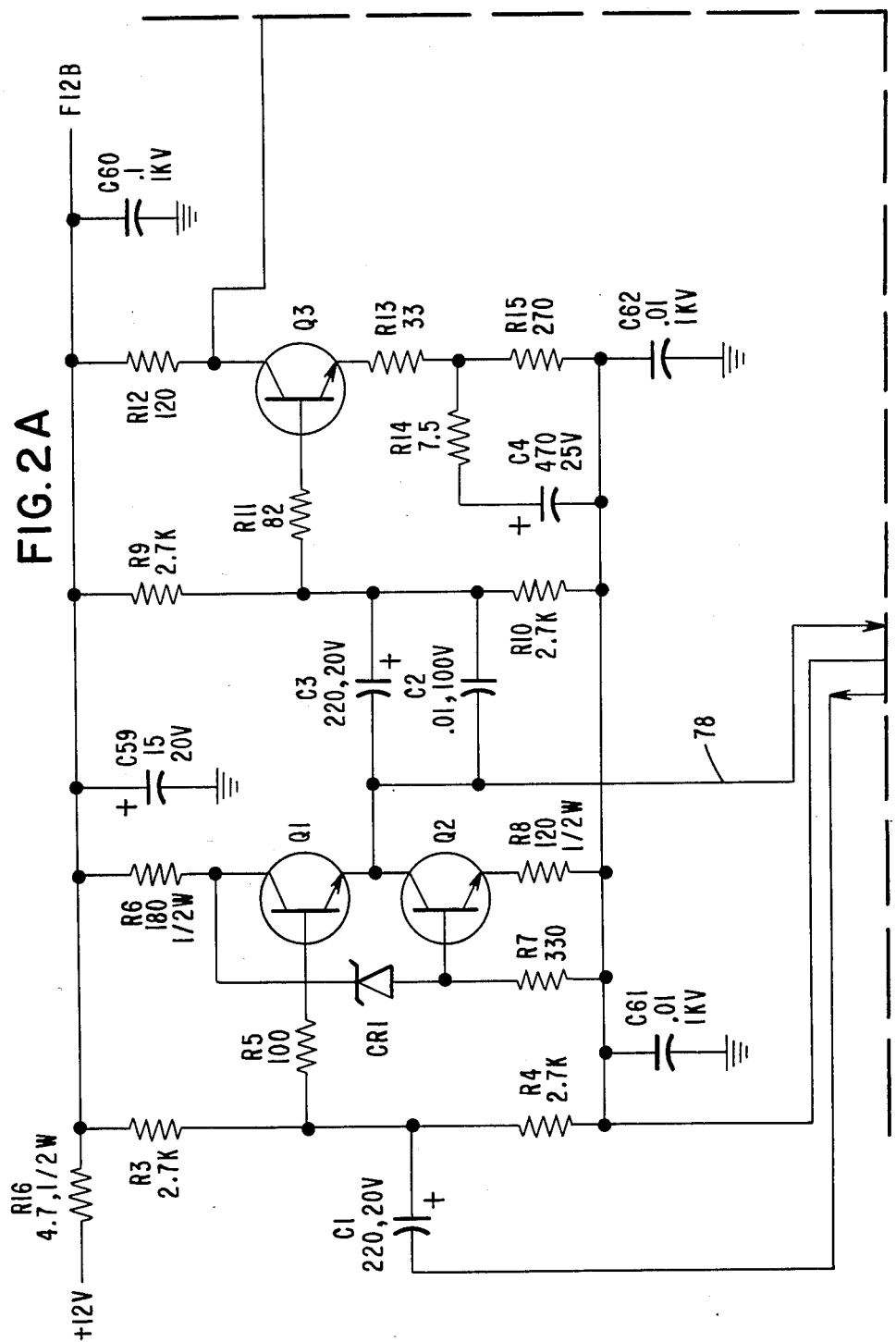
FIGS. 2A-2D, assembled as shown in FIG. 3, presents a schematic diagram of a sync strip circuit and a decoder circuit of FIG. 1.
Figure 2B:
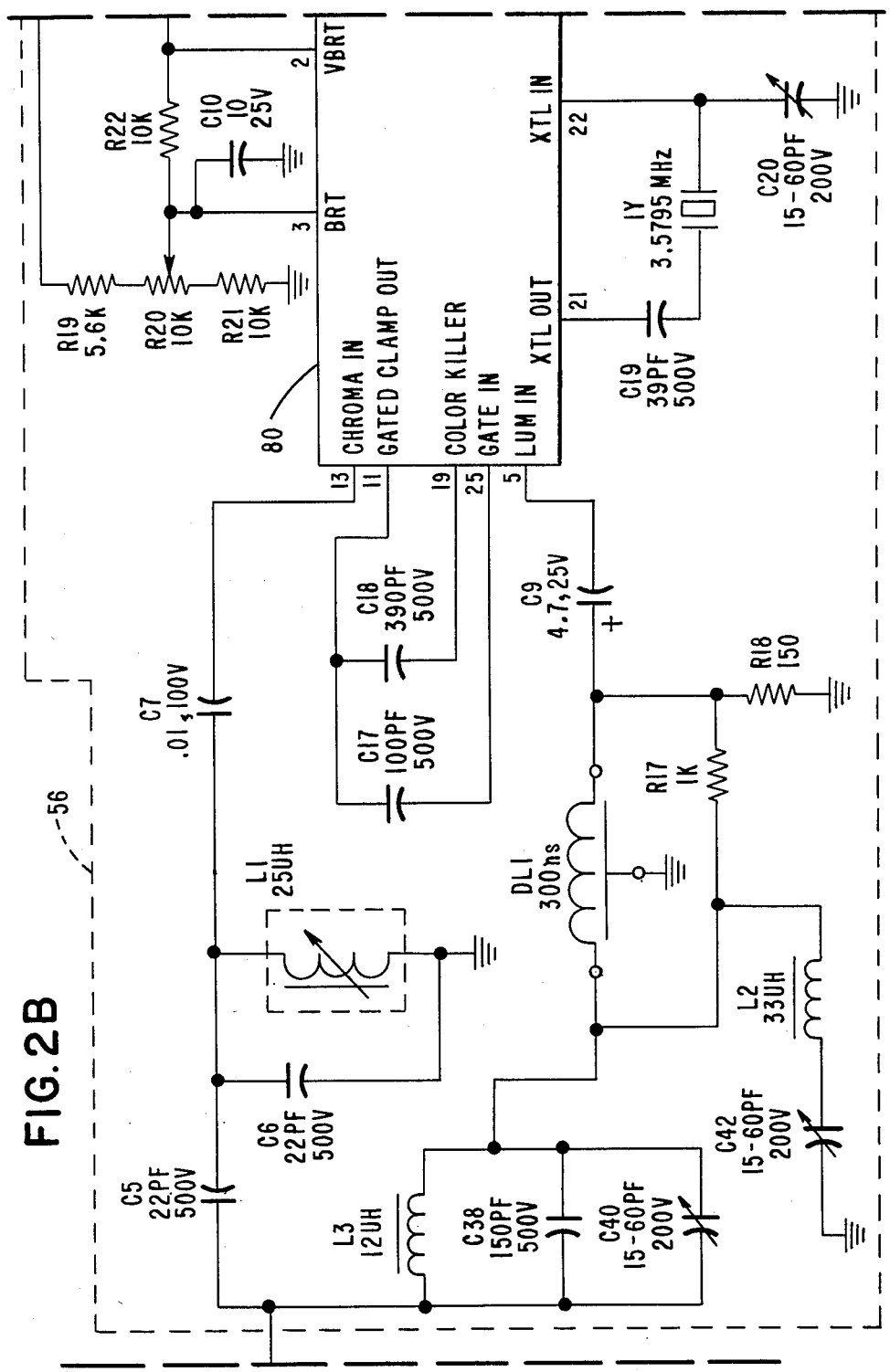
Figure 2C:
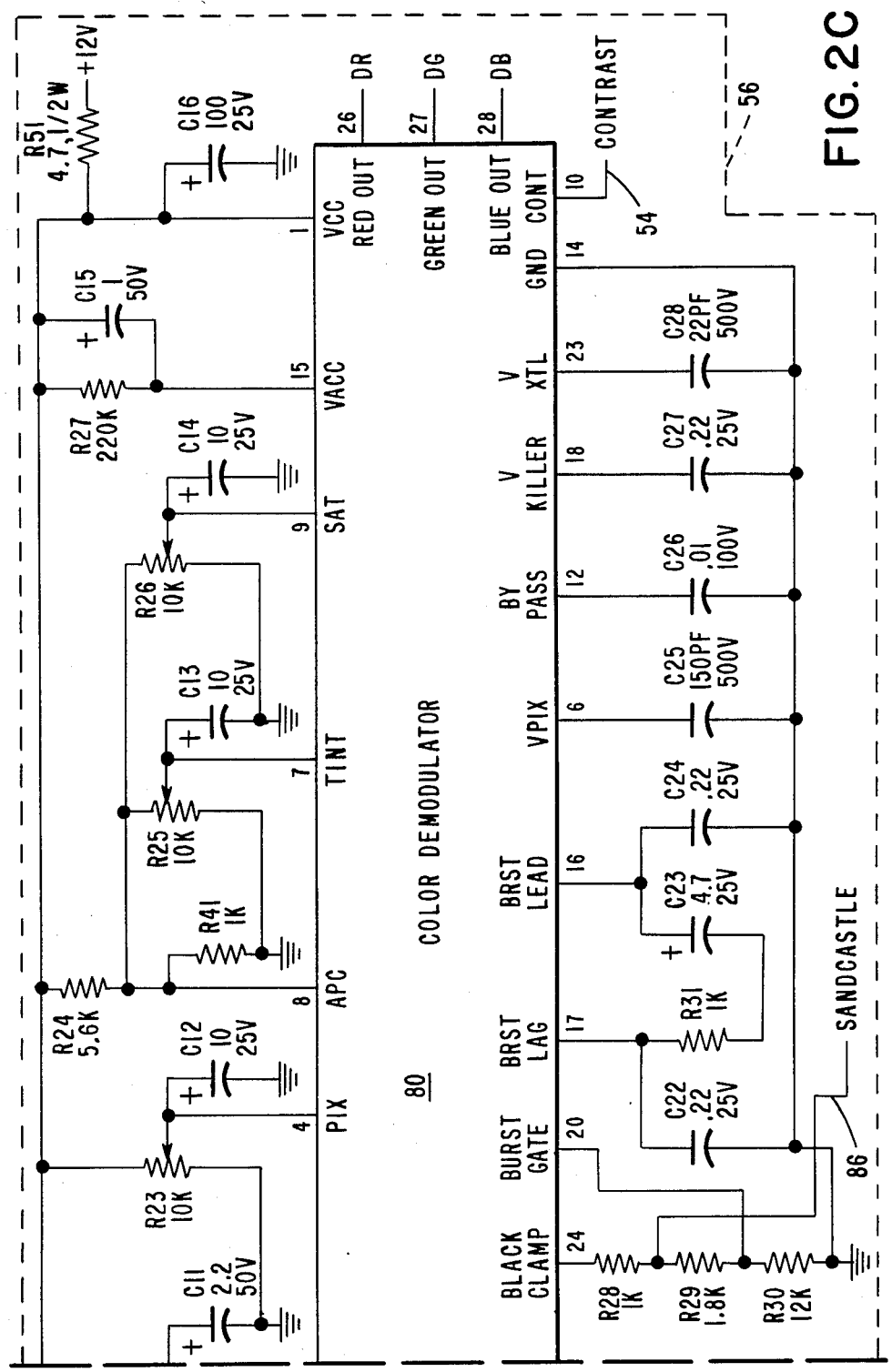

FIGS. 2A-2D, assembled as shown in FIG. 3, is a schematic diagram of a portion of the system of FIG. 1, and includes the sync strip circuit 12 (FIG. 2D) and the decoder circuit 56 (FIGS. 2B and 2C). A pair of video jacks 70 and 72 (FIG. 2D) are provided for receiving two separate video signals. A DIP relay 74 available from Magnecraft is further provided and is controlled by a SEL B/A signal from the computer 38 of FIG. 1, such as by operating a key on a keyboard, not shown. An 7406 integrated circuit chip 75 available from Texas Instruments or Motorola is provided to convert the computer generated SEL B/A signal to a voltage level sufficient to operate the relay 74. It will thus be understood that the disclosed system may be switched from one video signal to another, and that the switch will cause the DOT-CLK and derived HSYNC signals to be locked to the sync pulses of the new signal within a single frame of the video signal, as previously described.

The video signal selected by the relay 74 is fed to the video buffer circuit made up of transistors Q1 and Q2 (FIG. 2A), and zener diode CR1, connected as shown. Transistors Q1 and Q2 are 2N3904 NPN transistors, and diode CR1 is an IN751A zener diode, all available from Motorola.

The normal video input is through the video buffer of transistors Q1 and Q2 and over conductor 78, however a switch 79 is provided for connecting an external sync signal to the B input of jack 72, if desired. Thus, normal operation of the sync strip circuit 12 is accomplished when switch 79 is in its "normal" position. When the switch 79 is in its "external" position, the video input signal may only be supplied to the A input of jack 70, and an external sync source is supplied to the sync strip circuit 12 through the B input of jack 72. The described jacks 70 and 72, and video buffer of transistors Q1 and Q2 form the video input 10 of FIG. 1.

The sync strip circuit 12 (FIG. 2D) includes transistors Q8, Q4 and Q5, and diodes CR2 and CR3, connected as shown in FIG. 2. Transistors Q8 and Q4 are 2N3906 PNP transistors, transistor Q3 is a 2N3904NPN transistor, and diodes CR2 and CR3 are IN4148 signal diodes, all available from Motorola. The output of the sync strip circuit 12 is the stripped sync signal NTSC SYNC, as shown in FIG. 2D.

An inverting amplifier is formed by the circuit of transistor Q3 (FIG. 2A), which is a 2N5109 NPN transistor from Motorola, and is used to further buffer the video signal for the decoder circuit 56. The decoder circuit 56 (FIGS. 2B and 2C) includes a color demodulator integrated circuit chip 80, which may be either a TDA 3570 demodulator chip from Signetics, or a UC 1365 demodulator chip from NEC. The connection and operation of such demodulator chips is well understood, and will not be discussed further.

A SANDCASTLE signal is input to the demodulator chip 80 at 86 from a SANDCASTLE signal generating circuit which is part of the sync separator circuit 14, to be explained. The CONTRAST signal conductor 54 is connected to pin 10 of the demodulator chip 80, as shown.

Figure 4A:
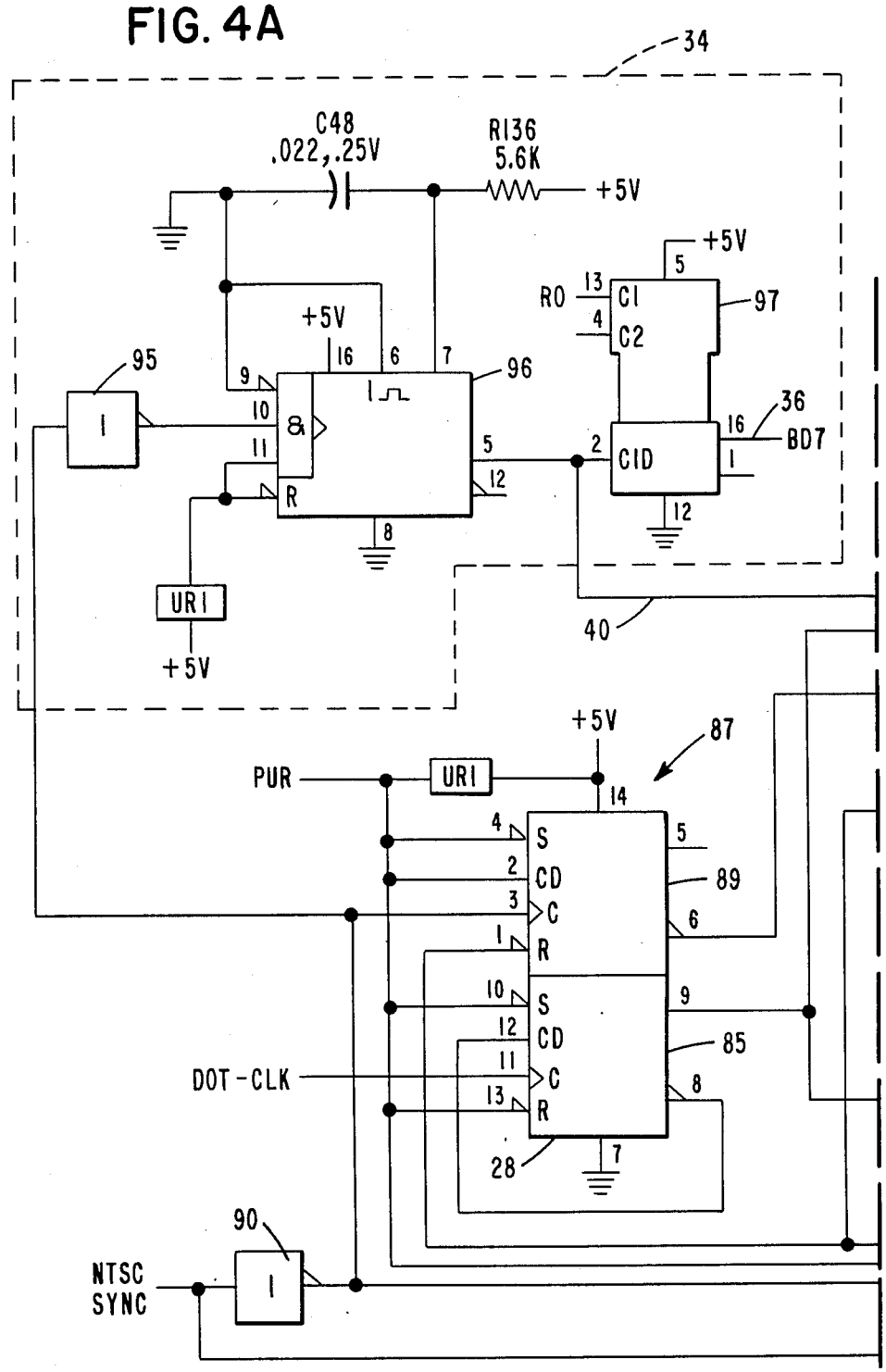
FIGS. 4A-4C, assembled as shown in FIG. 5, presents a schematic diagram of a sync separator circuit, a loss of sync circuit and a divide-by-two circuit of FIG. 1.
Figure 4B:
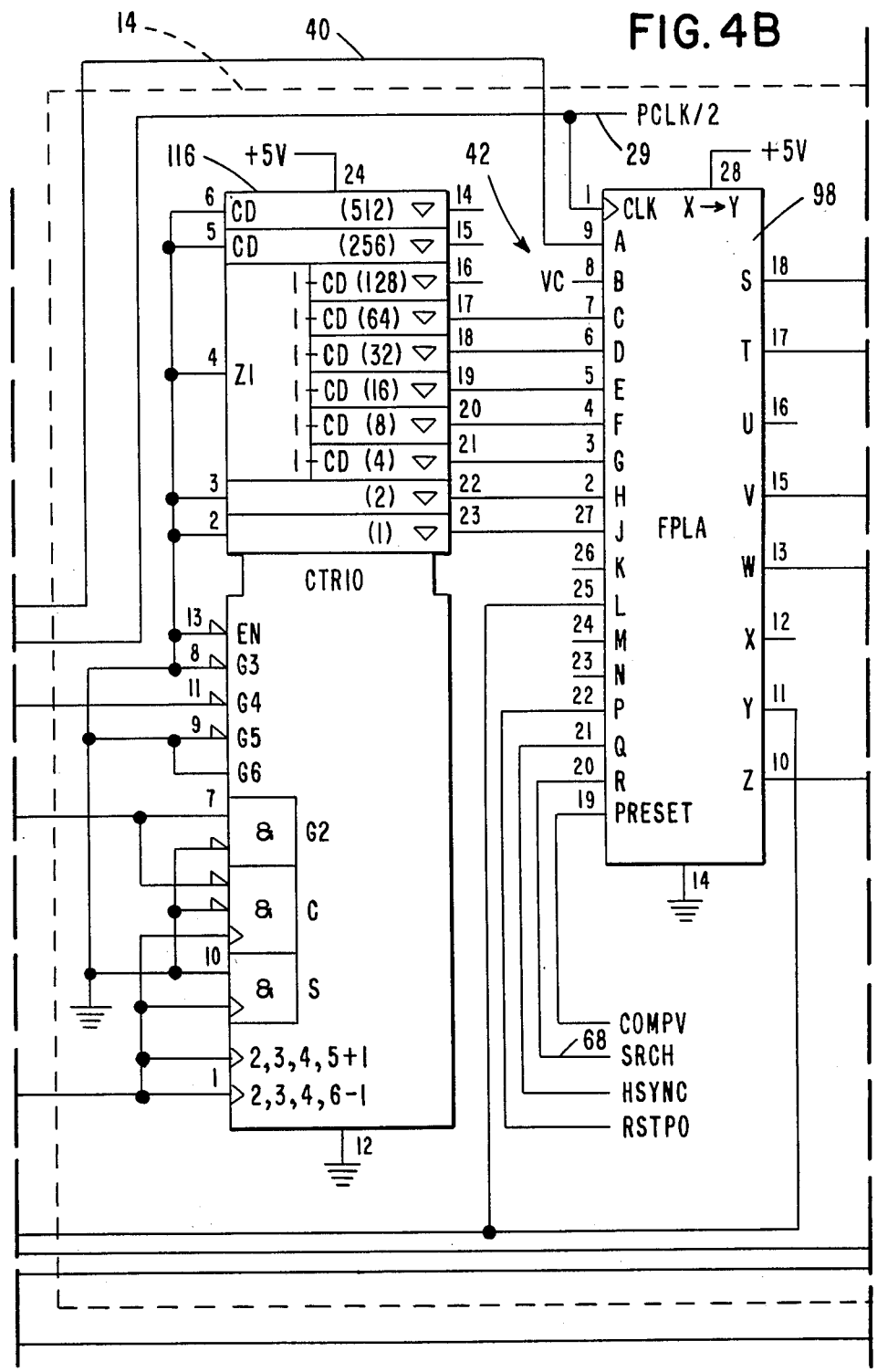
Figure 4C:
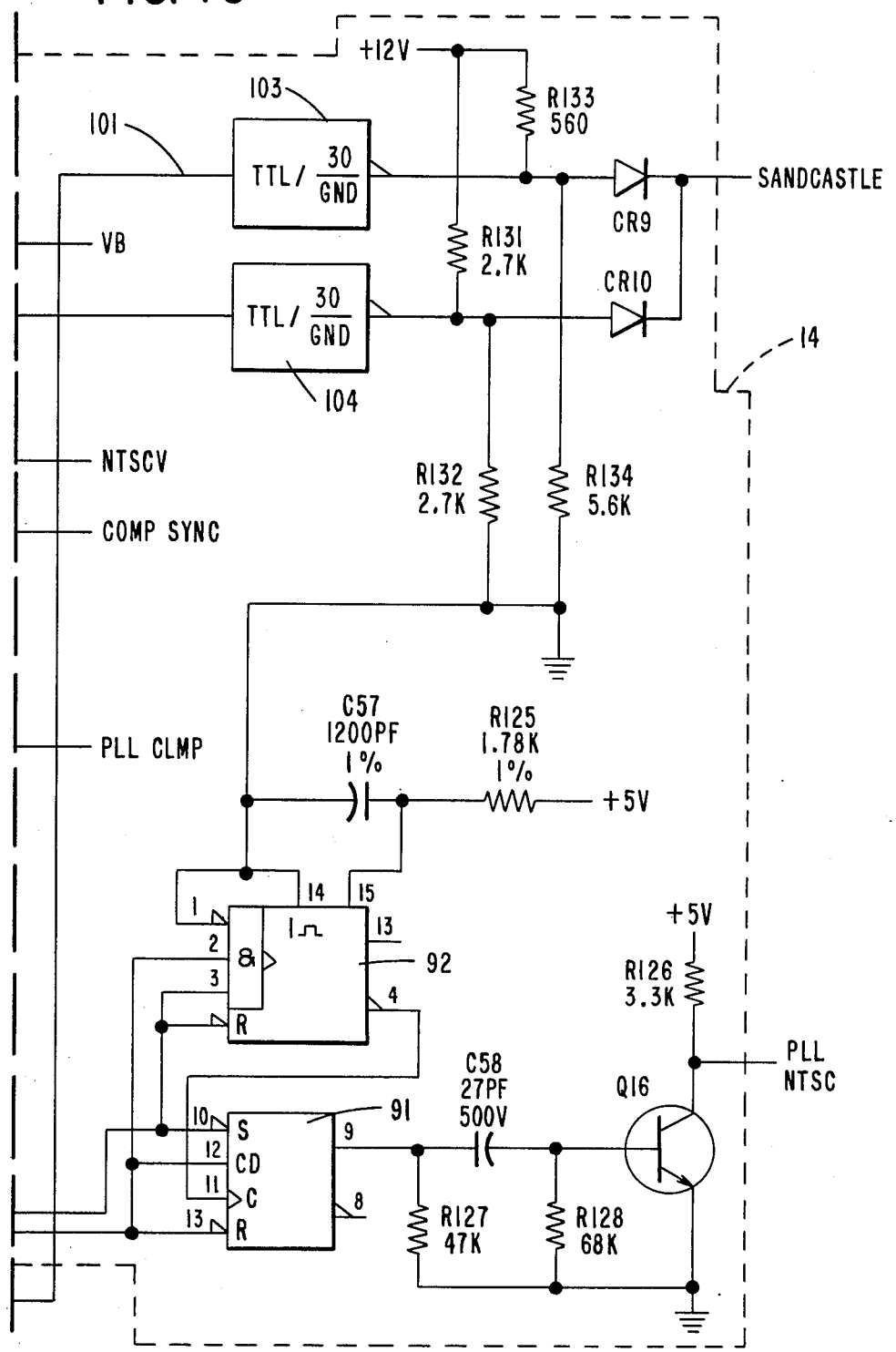

FIGS. 4A-4C, assembled as shown in FIG. 5, is a schematic diagram of a portion of the system of FIG. 1, and shows the sync separator circuit 14 (FIGS. 4B and 4C), the loss of sync circuit 34 (FIG. 4A), and the divide-by-two circuit 28 (FIG. 4A). The stripped sync signal, NTSC SYNC, from circuit 12 (see FIG. 2D) is inverted by an inverter 90 (FIG. 4A) which is a 74 HC04 CMOS hex inverter available from Motorola or National Semiconductor. The inverted NTSC SYNC signal is then applied to a D type flip/flop 91 (FIG. 4C) and a one shot circuit 92 as shown. The D type flip/flop 91 may be an 74HC74 device available from Motorola or National Semiconductor, and the one shot circuit is an 74HC123 integrated circuit available from National Semiconductor. This provides a delaying and pulse conditioning function so that the stripped and delayed horizontal sync pulses of the PLL NTSC signal may be phased with the HSYNC horizontal sync pulses from the CRT controller circuit 26, as discussed. The transistor Q16, which is a 2N3904 NPN transistor from Motorola, provides the input signal, PLL NTSC, for the phase locked loop circuit described.

Referring to FIG. 4A, the DOT-CLK signal from the pixel clock 24 of FIG. 1, is fed to the divide-by-two circuit which is one half 85 of a dual D type flip/flop 74HC74 integrated circuit 87 available from Motorola or National Semiconductor. The output of the flip/flop 85 is labeled PCLK/2, and is fed to a 10 bit counter 116, and to the input of a field programmable logic array (FPLA) 98 (see FIG. 4B). The FPLA 98 is a 82S105 FPLA available from the Signetics Corporation, and is programmed in accordance with Table 1. The programming of FPLA's is explained in the publication 98-7001-230, "Integrated Fuse Logic Data Manual 1984", available from the Signetics Corporation of Sunnyvale, Calif.

The counter 116 is decoded by the FPLA 98, as described and shown in Table 1. The burst portion of the SANDCASTLE pulse is generated at pin 17 of the FPLA 98. This is a pulse that begins coincident with the leading edge of the NTSC SYNC pulse from conductor 101 and is of approximately 6.2 microseconds duration. The correct voltage level is determined by divider formed from resistors R131 and R132 (FIG. 4C). The driver circuits 103 and 104 are from a 7406 integrated circuit, and the diodes CR9 and CR10, which hardwire OR the NTSC SYNC pulse from conductor 101 with the output of pin 17 of the FPLA 90, are IN418 diodes from Motorola. The SANDCASTLE signal is connected at 86 to the demodulator 80 of the decoder circuit 56 (see FIG. 2C) as previously mentioned.

TABLE 1

Preset/Enable Option: H

| TERM | Cn | input 1111 5432 RQPN | 11 1098 MLKJ | 7654 HGFE | 3210 DCBA | present state 543210 | next state 543210 | output 7654 ZYXW | 3210 VUTS |
|---|---|---|---|---|---|---|---|---|---|
| 0 | - | - - - - | - - - - | - - - - | - - - - | H H H H H H | L L L L L H | - L - H | L L H H |
| 1 | - | - - - - | - - - - | - - - - | - - - - | L L L L L H | L L L L L L | - H - - | - - - - |
| 2 | - | - - - - | - - - - | - - - - | - - - - | - - - - - - | - - - - - - | - - - - | - - - - |
| 3 | - | - - - - | - - - - | - - - - | - - - - | - - - - - - | - - - - - - | - - - - | - - - - |
| 4 | - | - - - - | - - - L | H L H L | L L - - | - - - - - L | - - - - - - | - - - - | - - L - |
| 5 | - | - - - - | - - - H | H L L H | H L - - | - - - - - L | - - - - - - | - - - - | - - H - |
| 6 | - | - - - - | - - - L | L H L L | H L - - | - - - - - L | - - - - - - | - - - - | - H - - |
| 7 | - | - - - - | - - - H | H L L H | H L - - | - - - - - L | - - - - - - | - - - - | - L - - |
| 8 | - | - - - - | - - - - | - - - - | - - - - | - - - - - - | - - - - - - | - - - - | - - - - |
| 9 | - | - - - - | - - - - | - - - - | - - - - | - - - - - - | - - - - - - | - - - - | - - - - |
| 10 | - | - L - - | - - - - | - - - - | - - - - | - - - - - L | - - - - - - | - - - - | L - - - |
| 11 | - | - - - - | - - - H | H H H L | L H - - | - - - - - L | - - - - - - | - L - - | - - - - |
| 12 | - | - - - - | - - - L | L L L H | L H - - | - - - - - L | - - - - - - | - H - - | - - - - |
| 13 | - | - - - - | - - - - | - - - - | - - - - | - - - - - - | - - - - - - | - - - - | - - - - |
| 14 | - | - - - - | - - - - | - - - - | - - - - | - - - - - - | - - - - - - | - - - - | - - - - |
| 15 | - | - - - - | - - - - | - - - - | - - - - | - - - - - - | - - - - - - | - - - - | - - - - |
| 16 | - | - - - - | - - - - | - - - - | - - - L | - - - - - L | - - - - - - | H - - - | - - - - |
| 17 | - | - L - - | - - - - | - - - - | - - - - | - - - - - L | - - - - - - | H - - - | - - - - |
| 18 | - | - H - - | - - - - | - - - - | - - - H | - - - - - L | - - - - - - | L - - - | - - - - |
| 19 | - | - - - - | - L - H | H H L L | L L - - | - - - - - L | - - - - - - | - L - - | - - - - |
| 20 | - | - - - - | - - - L | L L H L | L L - - | - - - - - L | - - - - - - | - H - - | - - - - |
| 21 | - | - - - - | - L - H | H L L L | L L - - | - - - - - L | - - - - - - | - L - - | - - - - |
| 22 | - | - - - - | - - - L | L H L L | L L - - | - - - - - L | - - - - - - | - H - - | - - - - |
| 23 | - | - - - - | - - - - | - - - - | - - - L | - - - - - L | - - - - - - | - - - - | L - - - |
| 24 | - | - H - - | - H - L | L L L L | H L - - | - - - - - L | H - - - - L | - - - - | - - - - |
| 25 | - | - H - - | - L - L | L L L L | L H - - | H - - - - L | L - - - - L | - - - - | - - - - |
| 26 | - | - H - - | - H - L | L H H L | L H - - | H - - - - L | L - - - - L | - - - - | H - - - |
| 27 | - | - H - - | - L - L | L H H L | L H - - | - - - - - L | L - - - - L | - - - - | L - - - |
| 28 | - | - - H - | - - - - | - - - - | - - - - | - - - - - L | - - - - - - | - - - - | - - - L |
| 29 | - | - - - - | - - - - | - - - - | - - H - | - - - - - L | - - - - - - | - - - - | - - - H |
| 30 | - | - H - - | - H - L | L H H L | L H - - | H - - - - L | - H - - - - | - - - - | - - - - |
| 31 | - | - H - - | - L - L | L H H L | L H - - | - - - - - L | - L - - - - | - - - - | - - - - |
| 32 | - | - - - - | - - - - | - - - - | - - - L | - - - - - L | - L - - - - | - - - - | - - - - |
| 33 | - | - - L - | - - H - | - - - - | - - - - | - L L L - L | - - L L L - | - - - - | - - - - |
| 34 | - | - - H - | - - H - | - - - - | - - - - | - L L L - L | - - L H H - | - - - - | - - - - |
| 35 | - | - - H- | - - H - | - - - - | - - - - | - H L H - L | - - H H - - | - - - - | - - - - |
| 36 | - | - - - - | - - L - | - - - - | - - - - | - L L H - L | - - H L L - | - - - - | - - - - |
| 37 | - | - - L - | - - - - | - - - - | - - - - | - - H L - L | - - L L - - | - - - - | - - - - |
| 38 | - | - - - - | - - H - | - - - - | - - - - | - H L L - L | - - H H H - | - - - - | - - - - |
| 39 | - | - - - - | - - - - | - - - - | - - - - | - L H H - L | - - H L L - | - - - - | - - - - |
| 40 | - | L - - - | - - - - | - - - - | - - - - | - - - - L L | - - - - - - | - - - H | - - - - |
| 41 | - | H - - - | - - - - | - - - - | - - - - | - - - - L L | - - - - - - | - - - L | - - - - |
| 42 | - | L - - - | - - - - | - - - - | - - - - | - - - - H L | - - - - - - | - - - L | - - - - |
| 43 | - | H - - - | - - - - | - - - - | - - - - | - - - - H L | - - - - - - | - - - H | - - - - |
| 44 | 0 | 0000 | 0000 | 0000 | 0000 | 000000 | 000000 | 0000 | 0000 |
| 45 | 0 | 0000 | 0000 | 0000 | 0000 | 000000 | 000000 | 0000 | 0000 |
| 46 | 0 | 0000 | 0000 | 0000 | 0000 | 000000 | 000000 | 0000 | 0000 |
| 47 | 0 | 0000 | 0000 | 0000 | 0000 | 000000 | 000000 | 0000 | 0000 |

The counter 116 is a 74LS491 integrated circuit available from Monolithic Memories. The outputs of the counter 116 act as a timer to time the various outputs of the FPLA 98. The leading edge of each NTSC SYNC signal pulse initiates the count sequence of the counter 116 by the action of the flip/flop 89 which is the other half of the dual D type flip/flop 87 already mentioned.

The sense of each NTSC SYNC pulse is sampled at approximately 12 microseconds, and, if a phase reversal has occurred, a vertical sync pulse or NTSCV is generated at pin 15 of the FPLA98 (see Terms 26 and 27 of Table 1), with a duration of approximately 381 microseconds. In this way the vertical sync pulses NTSCV are separated from the NTSC SYNC signal pulses.

The counter 116 is reset approximately 12 microseconds after being initiated by the NTSC SYNC pulse, by a reset signal from pin 11 of the FPLA 98 (FIG. 4B), to the reset terminal of the flip/flop 89 (FIG. 4A).

Turning now to the loss of sync detector circuit 34 (FIG. 4A), the inverted NTSC SYNC signal is again inverted by an 74HC04 inverter 95, and connected to a one shot device 96, which is an 74HC123 integrated circuit available from National Semiconductor. The pulse width of the one shot device 96 is about 1 ½ times the distance between adjacent sync pulses in the NTSC SYNC signal. It will then be understood that as long as the sync pulses of the NTSC SYNC signal occur, the output on pin 5 of the one shot device 96 will remain high. However, if the sync pulses of the NTSC SYNC signal are lost for a sufficient time for the one shot device 96 to time out, its pin 5 will go low, indicating that the video signal sync has been lost.

The output of one shot device 96 is stored in a register 97 made up of an 74HC75 dual transparent latch available from National Semiconductor. The R0 signal controlling register 97 is a read signal from the computer 38, to be explained.

The output of the one-shot device 96 is also fed by conductor 40 to an OR gate 42 in the FPLA 98 (FIG. 4B), previously described.

The signal on conductor 40 is OR-ed with the SRCH signal on conductor 68. As shown at terms 16, 17 and 18 of Table 1, as long as both signals on conductors 40 and 68 are high, the output on pin 10 of the FPLA 98 will remain low. However, if the signal on either conductor 40 (see Term 16 of Table 1), or the SRCH signal on conductor 68 (see Term 17 of Table 1), the output on pin 10 will go high. Thus, a low of the output signal (BD7) of register 97 indicates the video sync pulses in the NTSC SYNC signal are being detected, and a high indicates that the video signal has been lost.

Figure 6A:
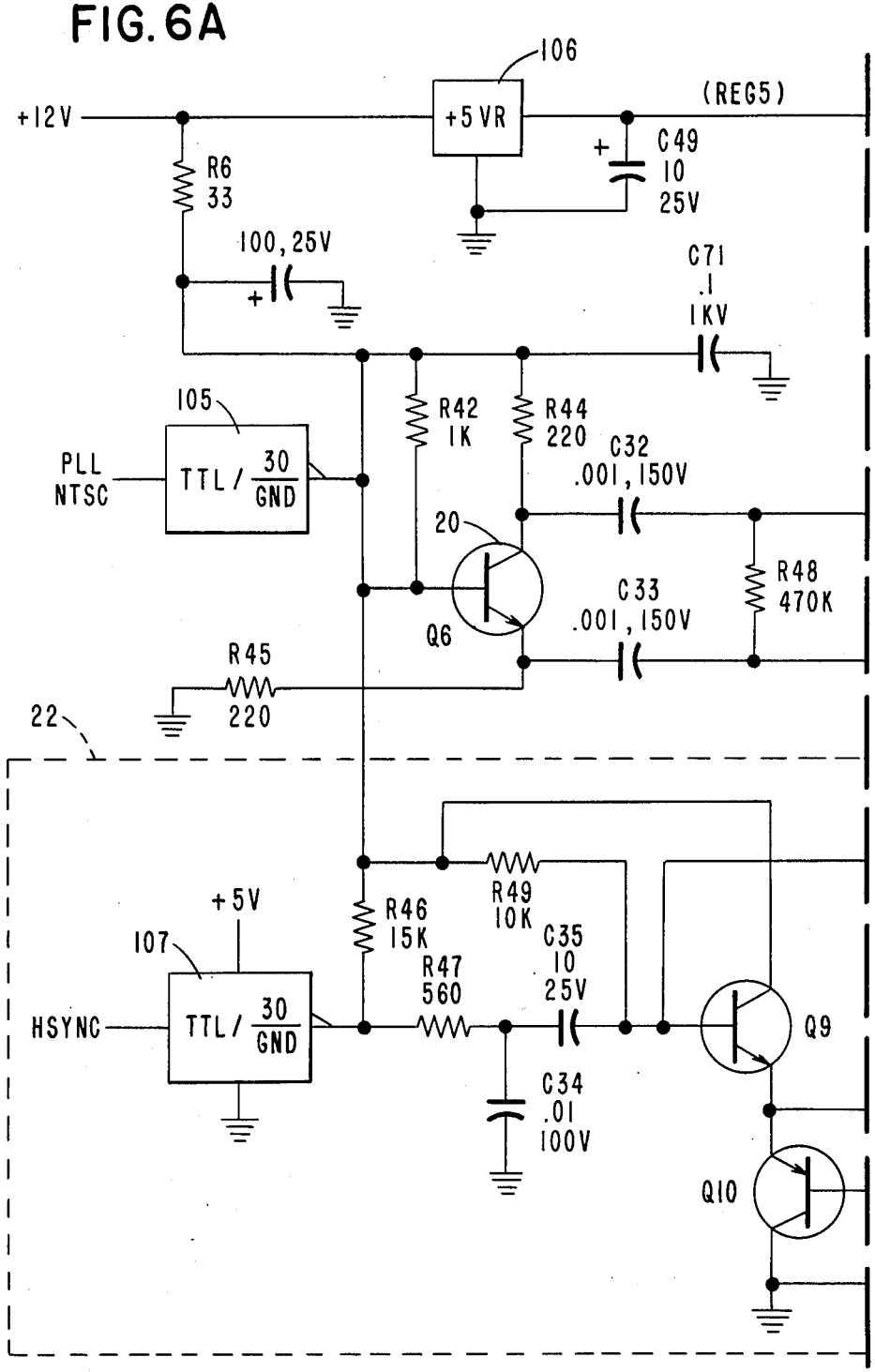
FIGS. 6A-6C, assembled as shown in FIG. 7, presents a schematic diagram of a phase splitter, a bridge circuit and a pixel clock circuit of FIG. 1.
Figure 6B:
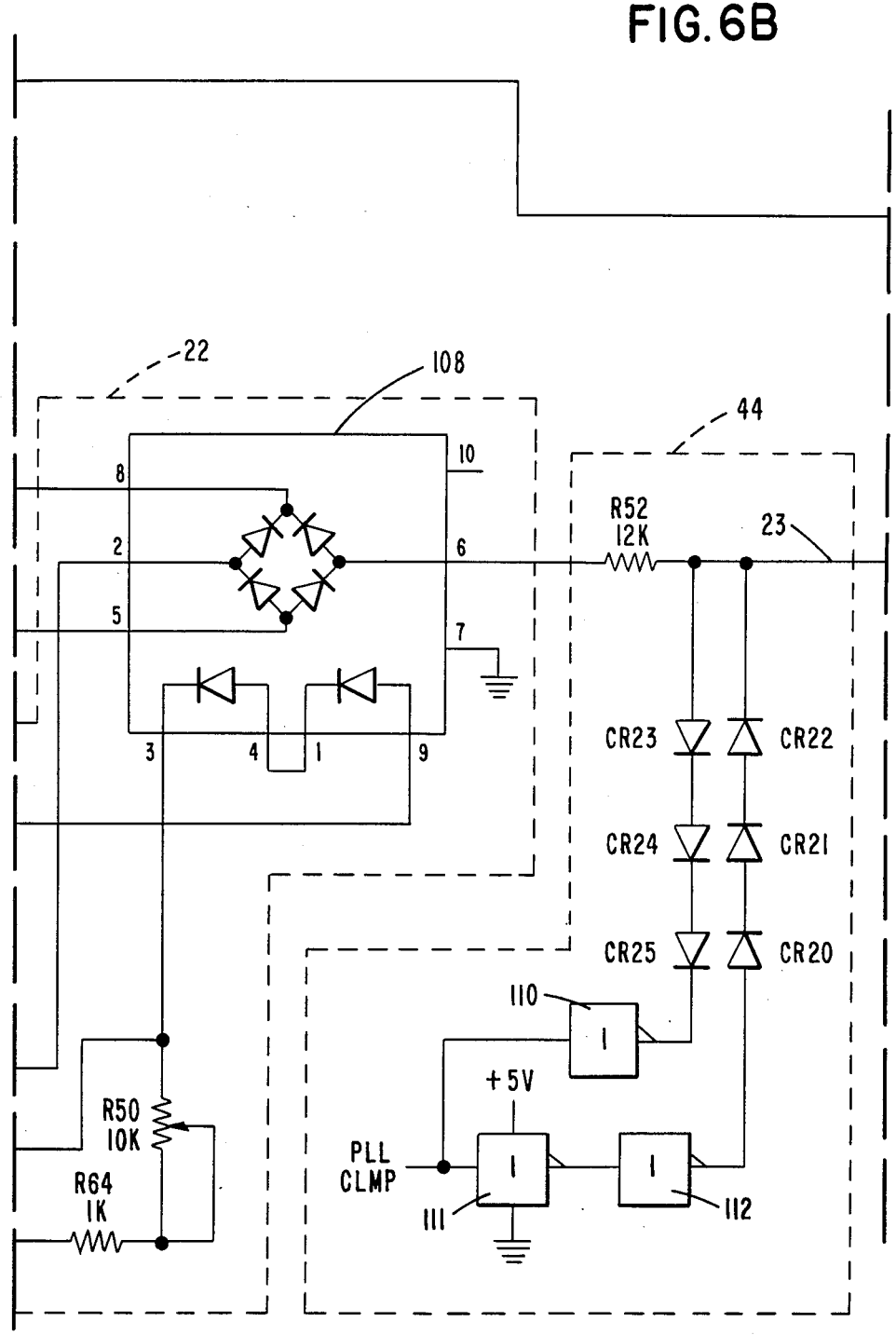
Figure 6C:
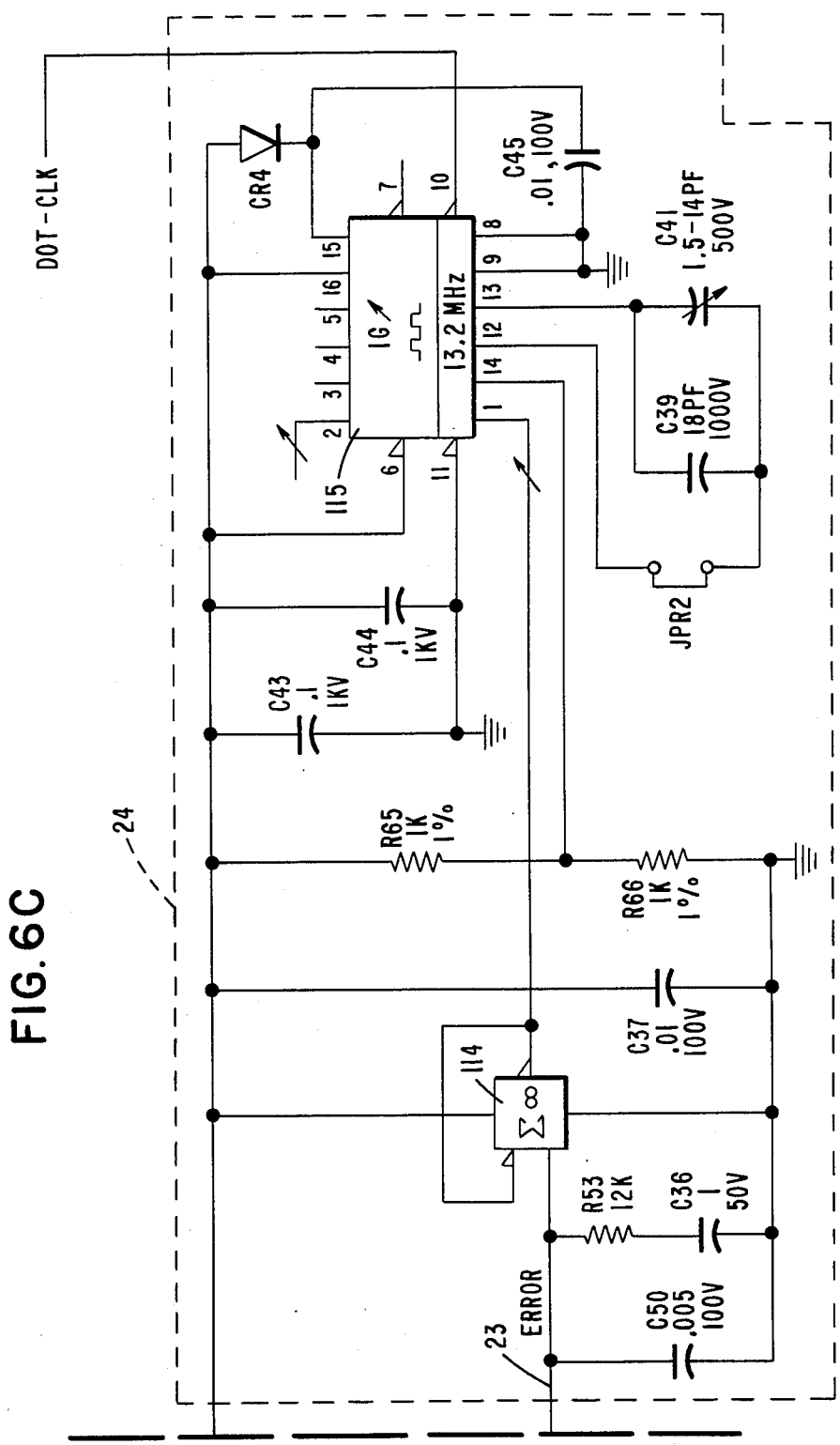

FIGS. 6A–6C, assembled as shown in FIG. 7, show a schematic diagram of a portion of the system of FIG. 1. FIG. 6A shows the phase splitter transistor 20, which is a 2N3904 NPN transistor from Motorola, and a portion of the bridge circuit 22. The remainder of the bridge circuit 22 and the clamp circuit 44 is shown in FIG. 6B. The pixel clock circuit 24 is shown in FIG. 6C.

The PLL NTSC signal from the sync separator circuit 14 (FIG. 4C) is connected through the driver circuit 105, to the base of phase splitter transistor 20, Q6. The driver circuit 105 is a 7406 Texas Instruments integrated circuit. Voltage is supplied by a 5 volt regulator 106, which is a T0220 Motorola regulator.

The HSYNC signal from the CRT controller circuit 26, to be discussed later, is fed to an 7406 Texas Instruments integrated circuit driver 107, to a ramp generator formed by resistors R46, R47, and capacitor C34. A ramp shifter is formed by the transistors Q9 and Q10, and by potentiometer R50 (FIG. 6B). Transistor Q9 is a 2N3904 NPN transistor, and Q10 is a 2N3906 PNP transistor, both available from Motorola. A phase detector is formed by a diode array 108 which may be a CA3019 array from RCA, connected as shown in FIG. 6B.

The circuit 22 thus determines the phase difference between PLL NTSC and the HSYNC pulses, and places a D.C. voltage error signal on conductor 23, as discussed in connection with FIG. 1. If the PLL CLMP signal from pin 10 of the FPLA 98 (see FIG. 4B) is high, the clamp circuit 44 is activated.

The clamp circuit 44 includes an inverter 110 for inverting the PLL CLMP signal, and a pair of inverters 111 and 112. The inverters 110, 111 and 112 are from an 74HC04 CMOS hex inverter integrated circuit available from National Semiconductor. When the PLL CLMP signal is high, the output of inverter 110 is grounded, and the output of inverter 112 goes to +5 volts. The forward voltage drop through the diodes CR20, CR21 and CR22 is the same as the forward voltage drop through diodes CR23, CR24 and CR25, thus locking the voltage on conductor 23 at a set level (2.5 volts), until the PLL CLMP signal goes low. Diodes CR20-CR25 are IN4148 diodes from Motorola.

The ERROR signal on conductor 23 is fed to unity gain amplifier 114 (FIG. 6C) which acts as a buffer and is an LM358 integrated circuit available from Motorola. The error voltage is then applied to a 74S124 voltage controlled oscillator 115 available from Texas Instruments, which modifies the mean output frequency of 13.2 MHz. The voltage controlled oscillator 115 supplies the DOT-CLK signal which is fed into the CRT controller 26 and the divide-by-two circuit 28 (see FIG. 1). Diode CR4 is a IN4148 diode available from Motorola.

Figure 8A:
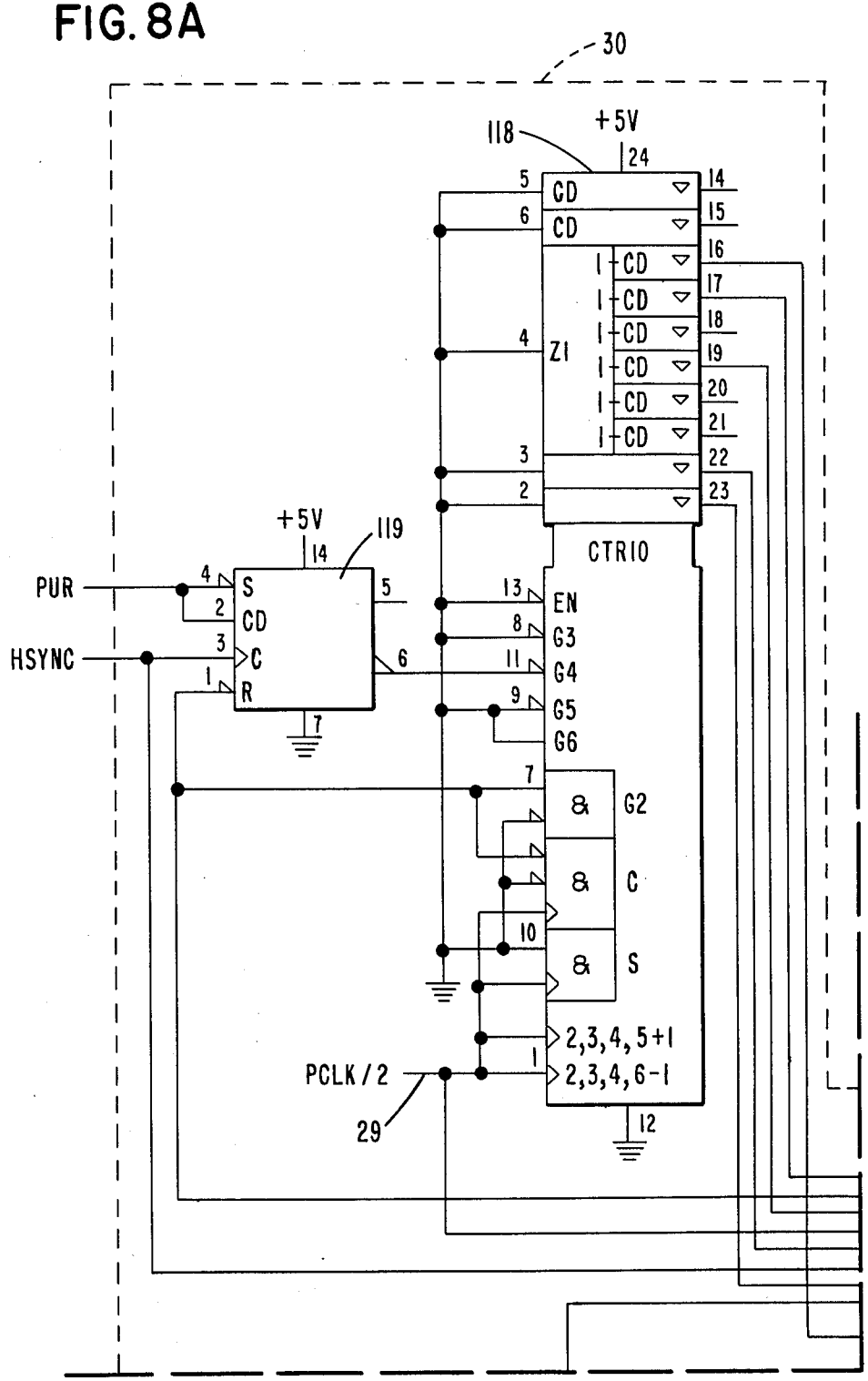
FIGS. 8A-8C, assembled as shown in FIG. 9, presents a schematic diagram of a compare and regeneration circuit of FIG. 1.
Figure 8B:
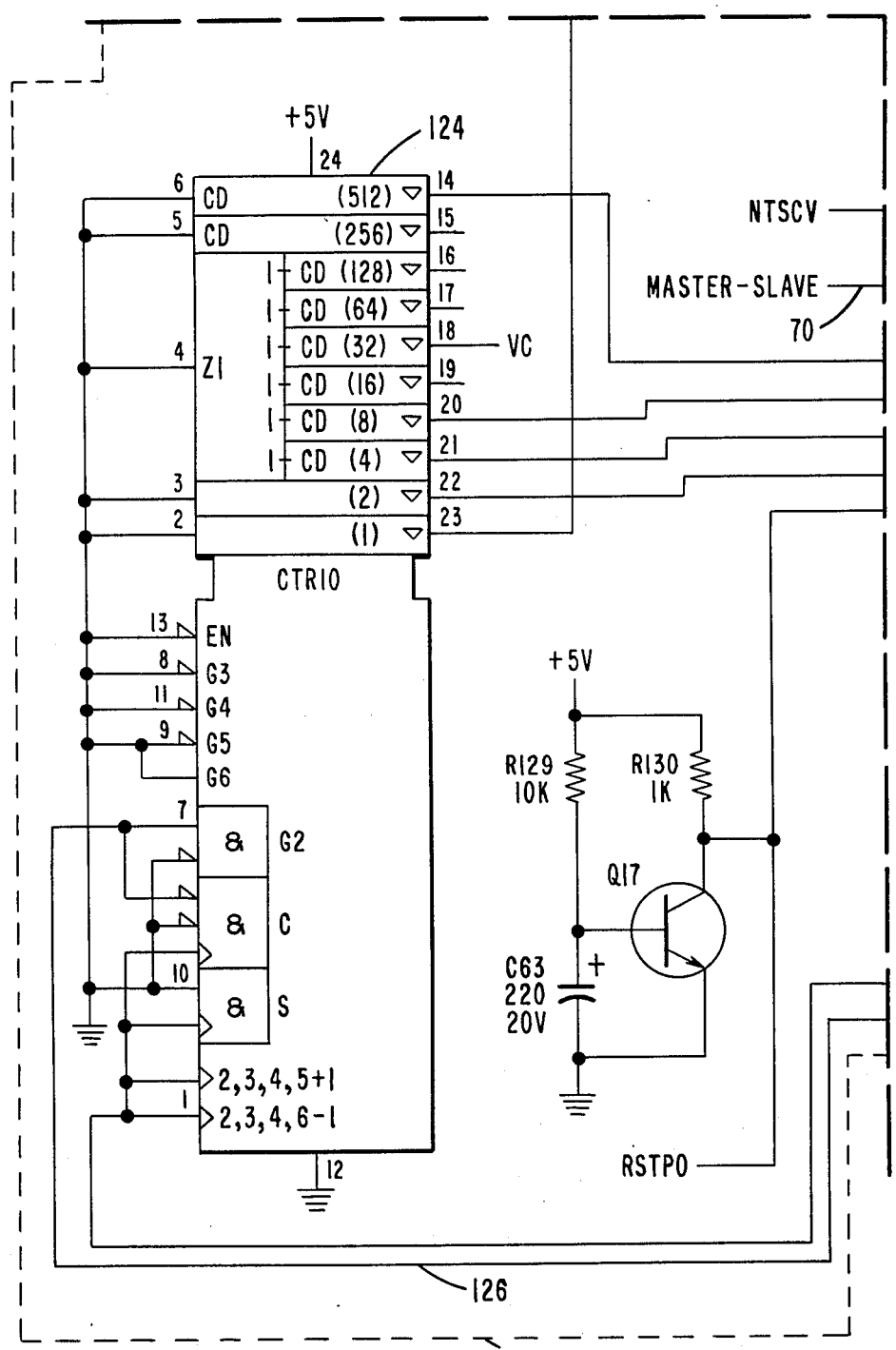
Figure 8C:
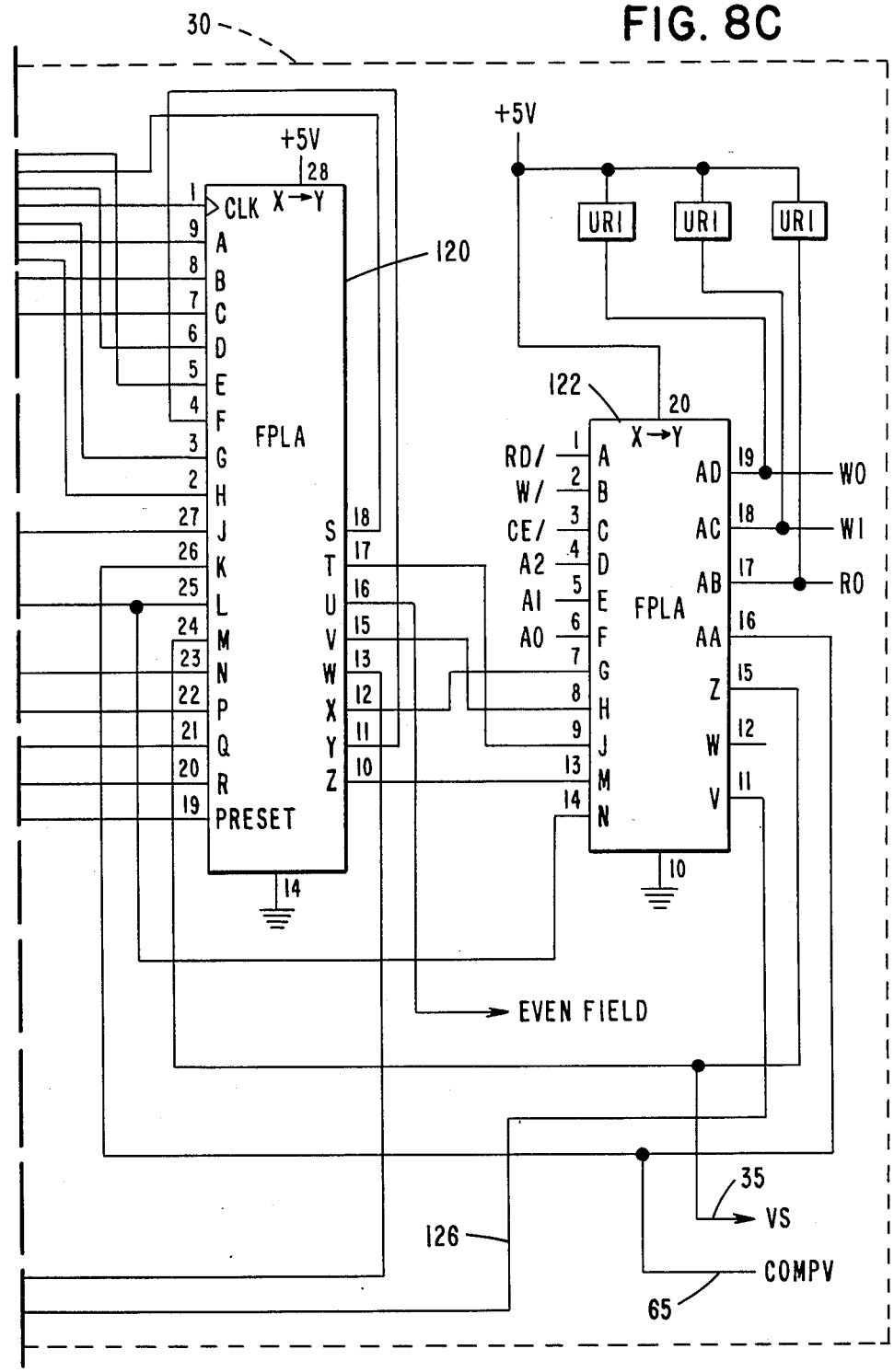

FIGS. 8A, 8B and 8C, assembled as shown in FIG. 9, form a schematic diagram of the compare and regeneration circuit 30 of FIG. 1.

It should be noted at this point, that each block labeled UR1 is a resistor network of seven resistors, wherein the network has a resistance of 1K ohms. The label PUR represents a pull up resistor.

The PCLK/2 output of FIG. 4B, is connected to pin 1 of a 10 bit counter 118 (FIG. 8A). Counting of the 10 bit counter 118 is initiated by HSYNC pulses from the CRT controller circuit 26 of FIG. 1, by the action of a D type flip/flop 119. The outputs of the counter 118 is decoded by an FPLA 120 (FIG. 8C), which is programmed in accordance with Table 2. FPLA 120 is an 82S105 FPLA available from Signetics Corporation.

TABLE 2

Preset/Enable Option: H

| | | input | | | | present state | next state | output | |
|---|---|---|---|---|---|---|---|---|---|
| | | 1 1 1 1 | 1 1 | | | | | | |
| TERM | Cn | 5 4 3 2 | 1 0 9 8 | 7 6 5 4 | 3 2 1 0 | 5 4 3 2 1 0 | 5 4 3 2 1 0 | 7 6 5 4 | 3 2 1 0 |
| | | RQPN | MLKJ | HGFE | DCBA | | | ZYXW | VUTS |
| 0 | — | ---- | ---- | ---- | ---- | HHHHHH | LLLHHL | LLLL | LLLL |
| 1 | — | ---- | ---- | ---- | ---- | - - - HHL | - - - HLL | - - - H | - - - H |
| 2 | — | ---- | ---- | ---- | ---- | - - - HLL | - - - HLH | - - - L | ---- |
| 3 | — | ---- | ---- | ---- | ---- | - - - HLH | - - - LLH | ---- | - - H- |
| 4 | — | ---- | ---- | LL- L | LL- H | - - - LLH | ------ | - H- H | ---- |
| 5 | — | ---- | ---- | HL- H | HH- - | - - - LLH | ------ | - L- H | ---- |
| 6 | — | ---- | ---- | LH- H | HH- - | - - - LLH | ------ | - - - L | - - - L |
| 7 | — | ---- | ---- | LL- - | LL- L | - - - LLH | ------ | - - - L | ---- |

TABLE 2-continued

| | | | | | | | | | |
|---|---|---|---|---|---|---|---|---|---|
| 8 | - | ---- | ---- | LL- L | LL- - | --- LLH | ------ | ---- | --- H |
| 9 | - | ---- | - H- H | ---- | ---- | --- LLH | ------ | ---- | H- - - |
| 10 | - | ---- | HL- - | ---- | ---- | --- LLH | ------ | ---- | H- - - |
| 11 | - | ---- | - H- L | ---- | ---- | --- LLH | ------ | ---- | L- - - |
| 12 | - | ---- | LL- - | ---- | ---- | --- LLH | ------ | ---- | L- - - |
| 13 | - | HHLH | ---- | ---- | - - H- | --- LLH | ------ | - - H- | - - H- |
| 14 | - | ---- | ---- | ---- | ---- | ------ | ------ | ---- | ---- |
| 15 | - | ---- | ---- | ---- | ---- | ------ | ------ | ---- | - - -O- |
| 16 | - | ---- | ---- | ---- | ---- | - - LLLH | ------ | L- - - | ---- |
| 17 | - | LHHH | ---- | ---- | - - L- | --- LLH | ------ | ---- | - - L- |
| 18 | - | - - - L | ---- | ---- | ---- | --- LLH | ------ | ---- | - - H- |
| 19 | - | ---- | - - H- | - - H- | ---- | LL- LLH | H- - - - - | ---- | - H- - |
| 20 | - | ---- | - - H- | - - L- | ---- | LL- LLH | - H- - - - | ---- | - L- - |
| 21 | - | ---- | - - L- | ---- | ---- | --- LLH | LL- - - - | ---- | ---- |
| 22 | - | HHHL | ---- | ---- | - - H- | --- LLH | ------ | - - L- | ---- |
| 23 | 0 | 0000 | 0000 | 0000 | 0000 | 000000 | 000000 | 0000 | 0000 |
| 24 | 0 | 0000 | 0000 | 0000 | 0000 | 000000 | 000000 | 0000 | 0000 |
| 25 | 0 | 0000 | 0000 | 0000 | 0000 | 000000 | 000000 | 0000 | 0000 |
| 26 | 0 | 0000 | 0000 | 0000 | 0000 | 000000 | 000000 | 0000 | 0000 |
| 27 | 0 | 0000 | 0000 | 0000 | 0000 | 000000 | 000000 | 0000 | 0000 |
| 28 | 0 | 0000 | 0000 | 0000 | 0000 | 000000 | 000000 | 0000 | 0000 |
| 29 | 0 | 0000 | 0000 | 0000 | 0000 | 000000 | 000000 | 0000 | 0000 |
| 30 | 0 | 0000 | 0000 | 0000 | 0000 | 000000 | 000000 | 0000 | 0000 |
| 31 | 0 | 0000 | 0000 | 0000 | 0000 | 000000 | 000000 | 0000 | 0000 |
| 32 | - | HHLH | ---- | ---- | - - H- | --- LLH | - - H- - - | ---- | ---- |
| 33 | - | ---- | - - H- | ---- | ---- | H- HLLH | ------ | H- - - | ---- |
| 34 | - | LHHH | - - - L | ---- | - - L- | --- LLH | - - L- - - | ---- | ---- |
| 35 | - | - - - L | - - - L | ---- | ---- | --- LLH | - - L- - - | ---- | ---- |
| 36 | 0 | 0000 | 0000 | 0000 | 0000 | 000000 | 000000 | 0000 | 0000 |
| 37 | 0 | 0000 | 0000 | 0000 | 0000 | 000000 | 000000 | 0000 | 0000 |
| 38 | 0 | 0000 | 0000 | 0000 | 0000 | 000000 | 000000 | 0000 | 0000 |
| 39 | 0 | 0000 | 0000 | 0000 | 0000 | 000000 | 000000 | 0000 | 0000 |
| 40 | 0 | 0000 | 0000 | 0000 | 0000 | 000000 | 000000 | 0000 | 0000 |
| 41 | 0 | 0000 | 0000 | 0000 | 0000 | 000000 | 000000 | 0000 | 0000 |
| 42 | 0 | 0000 | 0000 | 0000 | 0000 | 000000 | 000000 | 0000 | 0000 |
| 43 | 0 | 0000 | 0000 | 0000 | 0000 | 000000 | 000000 | 0000 | 0000 |
| 44 | 0 | 0000 | 0000 | 0000 | 0000 | 000000 | 000000 | 0000 | 0000 |
| 45 | 0 | 0000 | 0000 | 0000 | 0000 | 000000 | 000000 | 0000 | 0000 |
| 46 | 0 | 0000 | 0000 | 0000 | 0000 | 000000 | 000000 | 0000 | 0000 |
| 47 | 0 | 0000 | 0000 | 0000 | 0000 | 000000 | 000000 | 0000 | 0000 |

The outputs of FPLA 120, and control signals from the computer 38 of FIG. 1, is decoded by an FPLA 122, programmed in accordance with Table 3. FPLA 122 is an 82S153 FPLA available from Signetics Corporation.

TABLE 3

| | input | AND B(I) | | Polarity HH LHHL LLL OR B(O) | |
|---|---|---|---|---|---|
| Term | 7654 3210 HGFE DCBA | 98 7654 210 AA AAZN MWVJ DC BA | | 98 7654 3210 AA AAZN MWVJ DC BA | |
| 0 | - -LL LL- L | - - ---- ---- | | . . A. . . . . . . | |
| 1 | - -LL LLL- | - - ---- ---- | | A. . . . . . . . . | |
| 2 | - -HL LLL- | - - ---- ---- | | . A . . . . . . . . | |
| 3 | H- - - ---- | - - ---- ---- | | . . . A. . . . . A. | |
| 4 | - H- - ---- | - - ---- ---- | | . . . A. . . . . . | |
| 5 | ---- ---- | - - ---- - - -L | | . . . . . . . . . A. |
| 6 | ---- ---- | - - ---- H- - - | | . . . . A. . . . . |
| 7 | 0000 0000 | 00 0000 0000 | | AA AAAA AAAA | |
| 8 | 0000 0000 | 00 0000 0000 | | AA AAAA AAAA | |
| 9 | 0000 0000 | 00 0000 0000 | | AA AAAA AAAA | |
| 10 | 0000 0000 | 00 0000 0000 | | AA AAAA AAAA | |
| 11 | 0000 0000 | 00 0000 0000 | | AA AAAA AAAA | |
| 12 | 0000 0000 | 00 0000.0000 | | AA AAAA AAAA | |
| 13 | 0000 0000 | 00 0000 0000 | | AA AAAA AAAA | |
| 14 | 0000 0000 | 00 0000 0000 | | AA AAAA AAAA | |
| 15 | 0000 0000 | 00 0000 0000 | | AA AAAA AAAA | |
| 16 | 0000 0000 | 00 0000 0000 | | AA AAAA AAAA | |
| 17 | 0000 0000 | 00 0000 0000 | | AA AAAA AAAA | |
| 18 | 0000 0000 | 00 0000 0000 | | AA AAAA AAAA | |
| 19 | 0000 0000 | 00 0000 0000 | | AA AAAA AAAA | |
| 20 | 0000 0000 | 00 0000 0000 | | AA AAAA AAAA | |
| 21 | 0000 0000 | 00 0000 0000 | | AA AAAA AAAA | |
| 22 | 0000 0000 | 00 0000 0000 | | AA AAAA AAAA | |

TABLE 3-continued

| | | | | |
|---|---|---|---|---|
| 23 | 0000 0000 | 00 0000 0000 | AA AAAA AAAA | |
| 24 | 0000 0000 | 00 0000 0000 | AA AAAA AAAA | |
| 25 | 0000 0000 | 00 0000 0000 | AA AAAA AAAA | |
| 26 | 0000 0000 | 00 0000 0000 | AA AAAA AAAA | |
| 27 | 0000 0000 | 00 0000 0000 | AA AAAA AAAA | |
| 28 | 0000 0000 | 00 0000 0000 | AA AAAA AAAA | |
| 29 | 0000 0000 | 00 0000 0000 | AA AAAA AAAA | |
| 30 | 0000 0000 | 00 0000 0000 | AA AAAA AAAA | |
| 31 | 0000 0000 | 00 0000 0000 | AA AAAA AAAA | |
| D9 | ---- ---- | - - ---- ---- | ---- ---- -- | |
| D8 | ---- ---- | - - ---- ---- | ---- ---- -- | |
| D7 | ---- ---- | - - ---- ---- | ---- ---- -- | |
| D6 | ---- ---- | - - ---- ---- | ---- ---- -- | |
| D5 | ---- ---- | - - --- H- - - - | ---- ---- -- | |
| D4 | 0000 0000 | 00 0000 0000 | ---- ---- -- | |
| D3 | 0000 0000 | 00 0000 0000 | ---- ---- -- | |
| D2 | 0000 0000 | 00 0000 0000 | ---- ---- -- | |
| D1 | ---- ---- | - - ---- ---- | ---- ---- -- | |
| D0 | 0000 0000 | 00 0000 0000 | ---- ---- -- | |

As mentioned, each HSYNC pulse from the CRT controller 26 of FIG. 1, initiates the counting of PCLK/2 pulses by counter 118. The outputs of counter 118 is used to time the various outputs of the FPLA 120 of FIG. 8C. HSYNC pulses are also input at pin 9 of the FPLA 120, to be logic OR-ed with a decoded output on pin 11 of FPLA 120, which is input to pin 4 of FPLA 120, to give a pulse train consisting of the HSYNC sync pulses with another pulse of 150 nanoseconds duration midway between the HSYNC sync pulses (see terms 1, 2, 4, 5, 6 and 7 of Table 1). This pulse train, referred to as 2H pulses, are output on pin 13 of FPLA 120, and input to a 10 bit counter 124 (FIG. 8B). The counter 118 is reset by a signal from pin 18 of the FPLA 120, shortly after the midway pulse is generated on pin 13 of the FPLA 120.

The counter 124 is a 74LS491 counter available from Moholithic Memories, and counts while its pin 7 is high. Its pin 7 is connected by conductor 126 to output pin 11 of FPLA 122. Pin 11 of FPLA 122 is programmed to go low upon the presence of an NTSCV pulse input on pin 27 of FPLA 120, or when the count of counter 124 reaches the count "525" which is input at its pins 8, 23, 22, 21 and 20, indicating that a full frame of video data has been scanned. A low on conductor 126 to pin 7 of counter 124, resets the counter 124.

Thus, in the absence of an NTSCV sync pulse, the counter 124 and the FPLA 120 regenerates a vertical sync for use by the CRT controller circuit 26 of FIG. 1. This regenerated vertical sync is available on pin 12 of the FPLA 120. The regenerated vertical sync combined in FPLA 122 with the NTSCV (see Term 6 of Table 3), is output on pin 15 of the FPLA 122 (VS signal). The NTSCV signal combined with the regenerated sync has been further decoded by FPLA 120 (see Terms 16 and 33 of Table 2). The results of the programming for FPLA's 120 and 122 is, that if the NTSCV signal is present, vertical sync pulses regenerated from the NTSCV sync pulses are outputted as VS pulses on conductor 35 (see FIG. 1) connected to pin 15 of FPLA 122. However, if the NTSCV signal is not present, vertical sync pulses regenerated when the counter 124 counts to "525" are outputted as VS pulses on conductor 35.

Also, the COMPV composite vertical sync pulse signal is outputted on line 65 (see FIG. 1), which is connected to pin 16 of FPLA 122. The generation of the COMPV signal is also dependent upon the presence of the NTSCV vertical sync pulses, as described.

In addition to a pulse train which is twice the period of the horizontal rate (signal 2H), the count of counter 118 (FIG. 8A) is decoded by FPLA 120 (FIG. 8C) to generate a square pulse train equal to the horizontal rate. This pulse train is placed on pin 11, and is then inputted on pin 4 of FPLA 120, where it is used (see Terms 19 and 20 of Table 2) to determine odd and even field vertical sync pulses. The even field sync pulses are available on pin 16 of the FPLA 120.

An optional mode of operation is provided by providing for bi-directional operation of the VS conductor 35. In this mode of operation, the master/slave line 70 (see FIG. 1 and FIG. 8B) is raised to a high under software control. The master/slave high disables the output on pin 15 of FPLA 122, and the vertical sync pulses VS on line 35 are accepted from the CRT controller circuit 26 as the master vertical sync pulses. In this case, the computer 38 and the CRT controller circuit 26 of FIG. 1 would operate in a normal mode of operation without regard to the NTSC video signal on input 10.

A power-on reset is provided by an RSTPO signal to the collector of transistor Q17 (FIG. 8B), which may be an NPN 2N3904 transistor from Motorola. The RSTPO signal is held high until capacitor C63 charges and turns transistor Q17 on. Internal state generation of FPLA 98 of FIG. 4B and FPLA 120 of FIG. 8C is used to provide power-on resets to dual flip/flop 87, counters 116, 118 and 124, and flip/flop 119 previously described.

Pin 10 of counter 124 of FIG. 8B outputs a pulse (VC) when the "32" bit of the counter 124 turns on. This pulse is placed on pin 8 of FPLA 98 in FIG. 4B, which is decoded as output signal VB on pin 18 of FPLA 98. The VB signal is used for vertical blanking in the mixer circuit to be described.

Control lines for the data bus are connected from the computer 38 to the FPLA 122. Read (RD/), write (W/), chip-enable (CE/) and address lines (A0, A1, A2) are connected to pins 1-6, respectively, of FPLA 122 for decoding as W0, W1 and R0 signals on pins 19, 18 and 17, respectively. W0 latches the data on the bus, with the exception of bit 7; R0 turns the latched data back onto the bus with the addition of bit 7; and W1 latches the bus data into a latch for conversion by a D/A converter, all to be discussed.

Figure 10A:
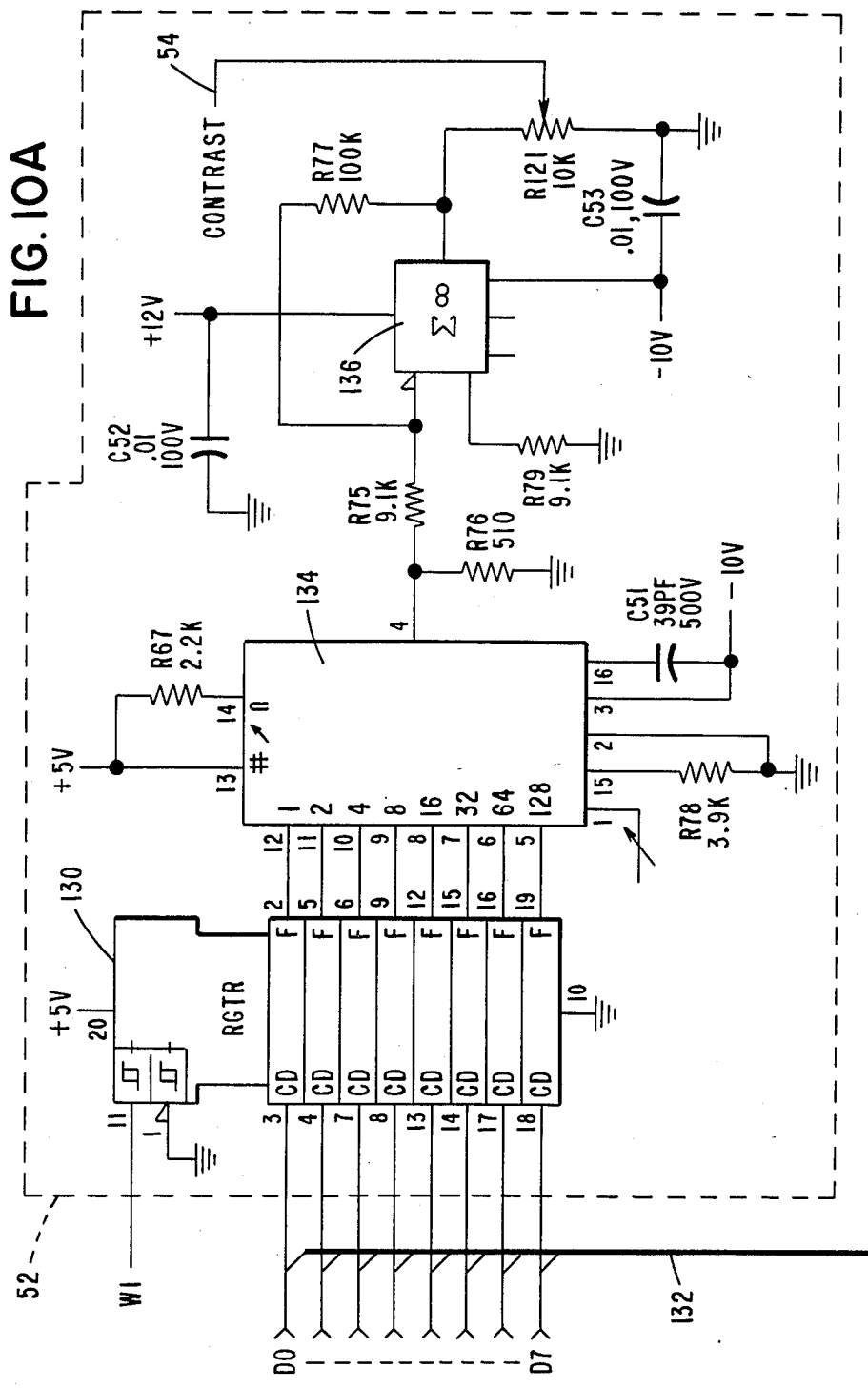

FIGS. 10A–10F, assembled as shown in FIG. 11, forms a schematic diagram of a portion of the system of FIG. 1. FIG. 10A shows the video contrast circuit 52, FIG. 10B shows the operation mode circuit 46, and FIGS. 10C–10F shows the mixer circuit 50.

Referring to FIG. 10A, the contrast circuit 52 includes a register 130 which is controlled by the W1 signal from pin 19 of FPLA 122 of FIG. 8C. When writing contrast data, the computer 38 places the contrast data on bits D0–D7 of the data bus 132, and activates the W1 signal through FPLA 124 as described, to load register 130. Register 130 is an octal flip/flop 74HC374 available from National Semiconductor.

A D/A converter 134, which is an MC1408P8 D/A converter from Motorola, is connected to the outputs of register 130, and is used in conjunction with an amplifier 136, which is an INT741 amplifier, to provide dynamic control over the NTSC contrast setting. The output of the D/A converter is a current output which is amplified by the Norton amplifier configuration of amplifier 136 before it is applied to the demodulator 80 of FIG. 2C over conductor 54 as the CONTRAST signal. Full voltage output is available when all of the inputs to D/A converter 134 are high, and minimum voltage output is available when all of the inputs are low.

Referring to FIG. 10B, a register 138 is provided controlled by the R0 read signal from pin 17 of FPLA 122 of FIG. 8C. The register 138 is a 74HC244 device available from National Semiconductor, and, when commanded by R0, places its contents on the data bus 132 to be read by the computer 38. As mentioned earlier, register 97 of FIG. 4A, also controlled by R0, places BD7 on pin 17 of register 138 for placement on D7 of the data bus 132, for transmission to the computer 38.

Operation mode circuit 46 includes a register 140, which is an 74HC374 octal flip/flop available from National Semiconductor, controlled by the W0 write signal from pin 19 of the FPLA 122 of FIG. 8C. The W0 signal causes data written on the data bus 132 by the computer to be latched into register 140. It will be noted that data bit 7 is not latched by register 140, since that data bit comes from the loss of sync circuit 34 previously described.

It will be noted that the SEL B/A signal is available on pin 16, the MASTER/SLAVE signal is available on pin 15, and the SCRH signal is available on pin 12, all part of register 140.

Other control signals are placed on bits D0–D3 of the data bus 132, and are available on the pins 2, 5, 6, 9, respectively of the register 140. Pin 2 provides a BLK/EN signal which, when high, turns off the computer graphics component signals DMR, DMG and DMB, and, when low, turns on the computer graphics signals. Pin 5 provides a H/F signal which, when high, displays the computer signals at half intensity, and when low, displays the computer signals at full intensity. Pin 6 provides a REP/ADD signal which, when high, operates the mixer circuit 50 in the replace mode, and which when low, operates the mixer circuit 50 in the add or translucent mode. Pin 9 provides the VBLK signal which, when high, blanks the video component signals R, G and B so that only the computer graphics signals remain, and which, when low, enables the video signal to appear with the computer graphics signals.

It will be understood that the conductors carrying the mentioned control signals, as well as the conductors carrying the SCRH, MASTER/SLAVE and SEL B/A signals make up the bus 48 of FIG. 1.

Figure 12:
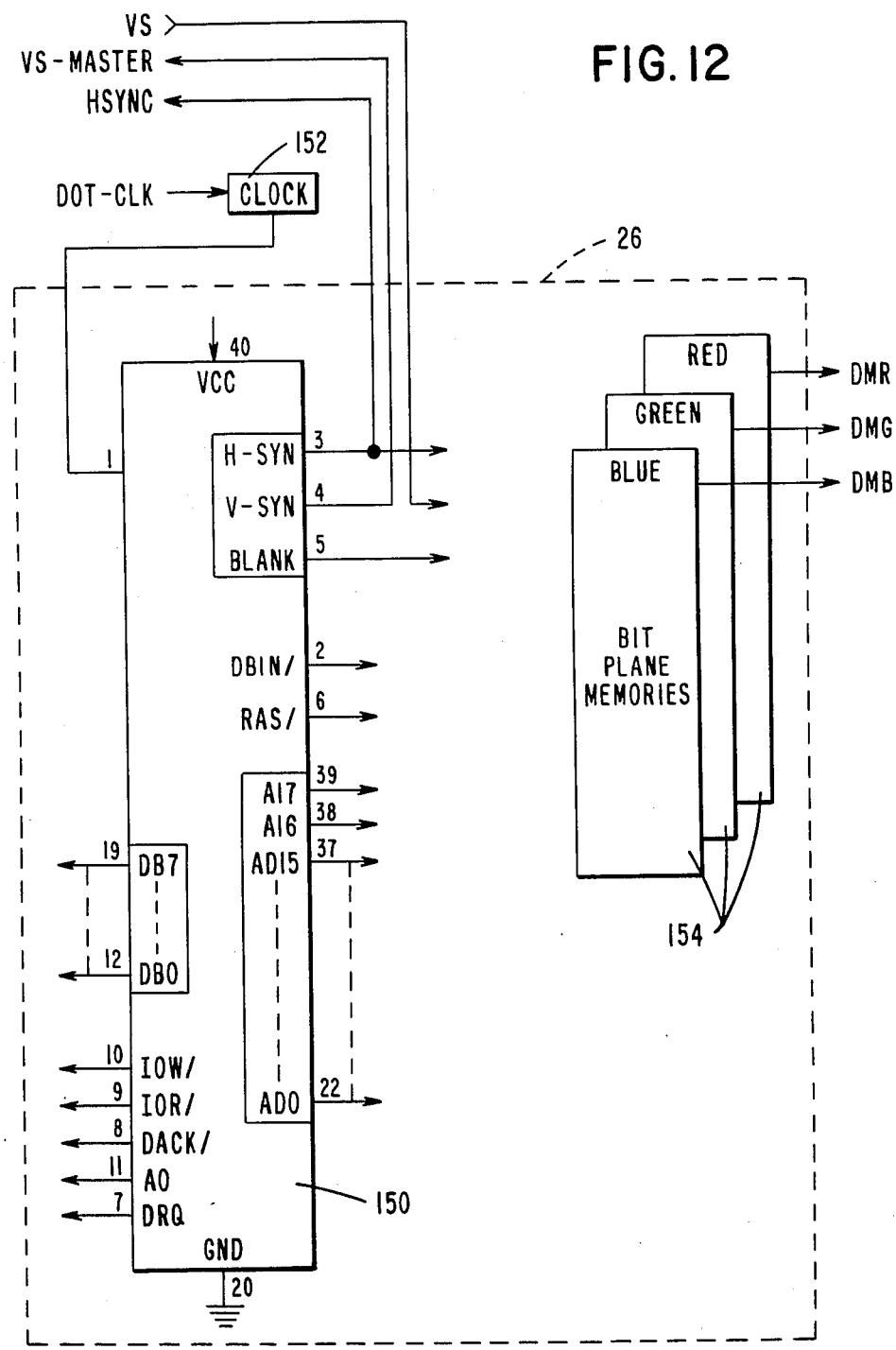
FIG. 12 is a block diagram of a cathode ray tube controller circuit of FIG. 1.

FIG. 12 is a block diagram of the CRT controller circuit 26 of FIG. 1. The CRT controller circuit 26 is controlled by a graphics controller integrated circuit 150 which, in the disclosed embodiment, is a GDC 7220-1 available from NEC (Nippon Electric Corp.). As shown in FIG. 12, the circuit 26 includes a clock 152 which is controlled by the DOT-CLK signal from the pixel clock VC0 24 of FIG. 1, from which all of the timing of the graphics controller 150 is derived. A derived horizontal sync pulse is output by the graphics controller on its pin 3, which is the HSYNC signal previously mentioned. A vertical sync pulse is output on pin 4, and a blanking pulse is output on pin 5 of the graphics controller 150. As previously mentioned, the vertical sync pulse on pin 4 is not placed on the VS line 35 (see FIG. 1 and FIG. 8C) unless the CRT controller circuit 26 is designated by software to be the master. When the CRT controller circuit is designated to be the slave, the VS signal on line 35, regenerated as discussed in connection with FIGS. 8A-8C, is placed on the VS line 35 and used by the CRT controller circuit 26.

The CRT controller circuit 26 includes bit plane memories, one for the red, green and blue components of the computer graphics, which are controlled by the outputs of the graphics controller 150 to generate the DMR, DMG and DMB signals used by the mixer circuit 50.

Since the use of graphics controller chips, and their control of bit plane memories to generate computer graphics signals is well understood in the art, the actual construction and operation of the individual elements of the CRT controller circuit 26 will not be further discussed.

Returning to FIG. 10C, the DMR, DMG and DMB signals from the CRT controller circuit 76 are provided to pins 1, 2 and 3, respectively, of an FPLA 160, whose outputs are buffered by an FPLA 162. The FPLA 160 is programmed in accordance with Table 4, and the FPLA 162 is programmed in accordance with Table 5. FPLA's 160 and 162 are 82S153 FPLA's available from Signetics Corporation.

TABLE 4

| | AND | | Polarity HH LHHL LLL OR | |
|---|---|---|---|---|
| | input | B(I) | | B(O) |
| Term | 7654 3210 HGFE DCBA | 98 7654 210 AA AAZN MWVJ DC BA | | 98 7654 3210 AA AAZN MWVJ DC BA |
| 0 | - L-- ---- | -- ---- ---- | | AA A... .... |
| 1 | - HH- - LLL | -- ---- ---- | | AA A... .... |
| 2 | - HH- - LLH | -- ---- ---- | | AA A... .... |
| 3 | - HH- - LHL | -- ---- ---- | | AA A... .... |
| 4 | - HH- - LHH | -- ---- ---- | | AA A... .... |
| 5 | - HH- - HLL | -- ---- ---- | | AA A... .... |

TABLE 4-continued

| 6 | - HH- - HLH | -- ---- ---- | AA A... .... |
|---|---|---|---|
| 7 | - HH- - HHL | -- ---- ---- | AA A... .... |
| 8 | --- H ---- | -- ---- ---- | AA A... .... |
| 9 | --- H ---- | -- ---- ---- | AA A... .... |
| 10 | --- H ---- | -- ---- ---- | AA A... .... |
| 11 | ---- LL-- | -- ---- ---- | AA A... .... |
| 12 | ---- L- L- | -- ---- ---- | AA A... .... |
| 13 | ---- L-- L | -- ---- ---- | AA A... .... |
| 14 | L--- ---- | -- ---- ---- | AA A... .... |
| 15 | 0000 0000 | 00 0000 0000 | AA AAAA AAAA |
| 16 | 0000 0000 | 00 0000 0000 | AA AAAA AAAA |
| 17 | 0000 0000 | 00 0000 0000 | AA AAAA AAAA |
| 18 | 0000 0000 | 00 0000 0000 | AA AAAA AAAA |
| 19 | 0000 0000 | 00 0000 0000 | AA AAAA AAAA |
| 20 | 0000 0000 | 00 0000 0000 | AA AAAA AAAA |
| 21 | 0000 0000 | 00 0000 0000 | AA AAAA AAAA |
| 22 | 0000 0000 | 00 0000 0000 | AA AAAA AAAA |
| 23 | 0000 0000 | 00 0000 0000 | AA AAAA AAAA |
| 24 | 0000 0000 | 00 0000 0000 | AA AAAA AAAA |
| 25 | 0000 0000 | 00 0000 0000 | AA AAAA AAAA |
| 26 | 0000 0000 | 00 0000 0000 | AA AAAA AAAA |
| 27 | 0000 0000 | 00 0000 0000 | AA AAAA AAAA |
| 28 | 0000 0000 | 00 0000 0000 | AA AAAA AAAA |
| 29 | 0000 0000 | 00 0000 0000 | AA AAAA AAAA |
| 30 | 0000 0000 | 00 0000 0000 | AA AAAA AAAA |
| 31 | 0000 0000 | 00 0000 0000 | AA AAAA AAAA |
| D9 | ---- ---- | -- ---- ---- | ------------ |
| D8 | ---- ---- | -- ---- ---- | ------------ |
| D7 | ---- ---- | -- ---- ---- | ------------ |
| D6 | ---- ---- | -- ---- ---- | ------------ |
| D5 | ---- ---- | -- ---- ---- | ------------ |
| D4 | ---- ---- | -- ---- ---- | ------------ |
| D3 | ---- ---- | -- ---- ---- | ------------ |
| D2 | ---- ---- | -- ---- ---- | ------------ |
| D1 | ---- ---- | -- ---- ---- | ------------ |
| D0 | 0000 0000 | 00 0000 0000 | ------------ |

TABLE 5

| | AND | | Polarity HH LHHL LLL OR | |
|---|---|---|---|---|
| | input | B(I) | | B(O) |
| Term | 7654 3210 HGFE DCBA | 98 7654 210 AA AAZN MWVJ DC BA | | 98 7654 3210 AA AAZN MWVJ DC BA |
| 0 | ---- ---0 | -- ---- ---- | | AA AAAA AAA. |
| 1 | 0000 0000 | 00 0000 0000 | | AA AAAA AAAA |
| 2 | 0000 0000 | 00 0000 0000 | | AA AAAA AAAA |
| 3 | 0000 0000 | 00 0000 0000 | | AA AAAA AAAA |
| 4 | 0000 0000 | 00 0000 0000 | | AA AAAA AAAA |
| 5 | 0000 0000 | 00 0000 0000 | | AA AAAA AAAA |
| 6 | 0000 0000 | 00 0000 0000 | | AA AAAA AAAA |
| 7 | 0000 0000 | 00 0000 0000 | | AA AAAA AAAA |
| 8 | 0000 0000 | 00 0000 0000 | | AA AAAA AAAA |
| 9 | 0000 0000 | 00 0000 0000 | | AA AAAA AAAA |
| 10 | 0000 0000 | 00 0000 0000 | | AA AAAA AAAA |
| 11 | 0000 0000 | 00 0000 0000 | | AA AAAA AAAA |
| 12 | 0000 0000 | 00 0000 0000 | | AA AAAA AAAA |
| 13 | 0000 0000 | 00 0000 0000 | | AA AAAA AAAA |
| 14 | 0000 0000 | 00 0000 0000 | | AA AAAA AAAA |
| 15 | 0000 0000 | 00 0000 0000 | | AA AAAA AAAA |
| 16 | 0000 0000 | 00 0000 0000 | | AA AAAA AAAA |
| 17 | 0000 0000 | 00 0000 0000 | | AA AAAA AAAA |
| 18 | 0000 0000 | 00 0000 0000 | | AA AAAA AAAA |
| 19 | 0000 0000 | 00 0000 0000 | | AA AAAA AAAA |
| 20 | 0000 0000 | 00 0000 0000 | | AA AAAA AAAA |
| 21 | 0000 0000 | 00 0000 0000 | | AA AAAA AAAA |
| 22 | 0000 0000 | 00 0000 0000 | | AA AAAA AAAA |
| 23 | 0000 0000 | 00 0000 0000 | | AA AAAA AAAA |
| 24 | 0000 0000 | 00 0000 0000 | | AA AAAA AAAA |
| 25 | 0000 0000 | 00 0000 0000 | | AA AAAA AAAA |
| 26 | 0000 0000 | 00 0000 0000 | | AA AAAA AAAA |
| 27 | 0000 0000 | 00 0000 0000 | | AA AAAA AAAA |
| 28 | 0000 0000 | 00 0000 0000 | | AA AAAA AAAA |
| 29 | 0000 0000 | 00 0000 0000 | | AA AAAA AAAA |
| 30 | 0000 0000 | 00 0000 0000 | | AA AAAA AAAA |
| 31 | 0000 0000 | 00 0000 0000 | | AA AAAA AAAA |
| D9 | ---- ---L | -- ---- ---- | | ------------ |
| D8 | ---- --L- | -- ---- ---- | | ------------ |

TABLE 5-continued

```
D7  ---- -L-- --  ---- ----  -----------
D6  ---- L--- --  ---- ----  -----------
D5  ---L ---- --  ---- ----  -----------
D4  --L- ---- --  ---- ----  -----------
D3  -L-- ---- --  ---- ----  -----------
D2  L--- ---- --  ---- ----  -----------
D1  ---- ---- --  ---- ---L  -----------
D0  0000 0000 00  0000 0000  -----------
```

The control signals BLK/EN, H/F, REP/ADD and VBLK are provided on pins 4–7, respectively, of the FPLA 160. The VB signal on pin 8 is the vertical blanking signal from pin 18 of the FPLA 98, as previously mentioned.

Figure 10C:
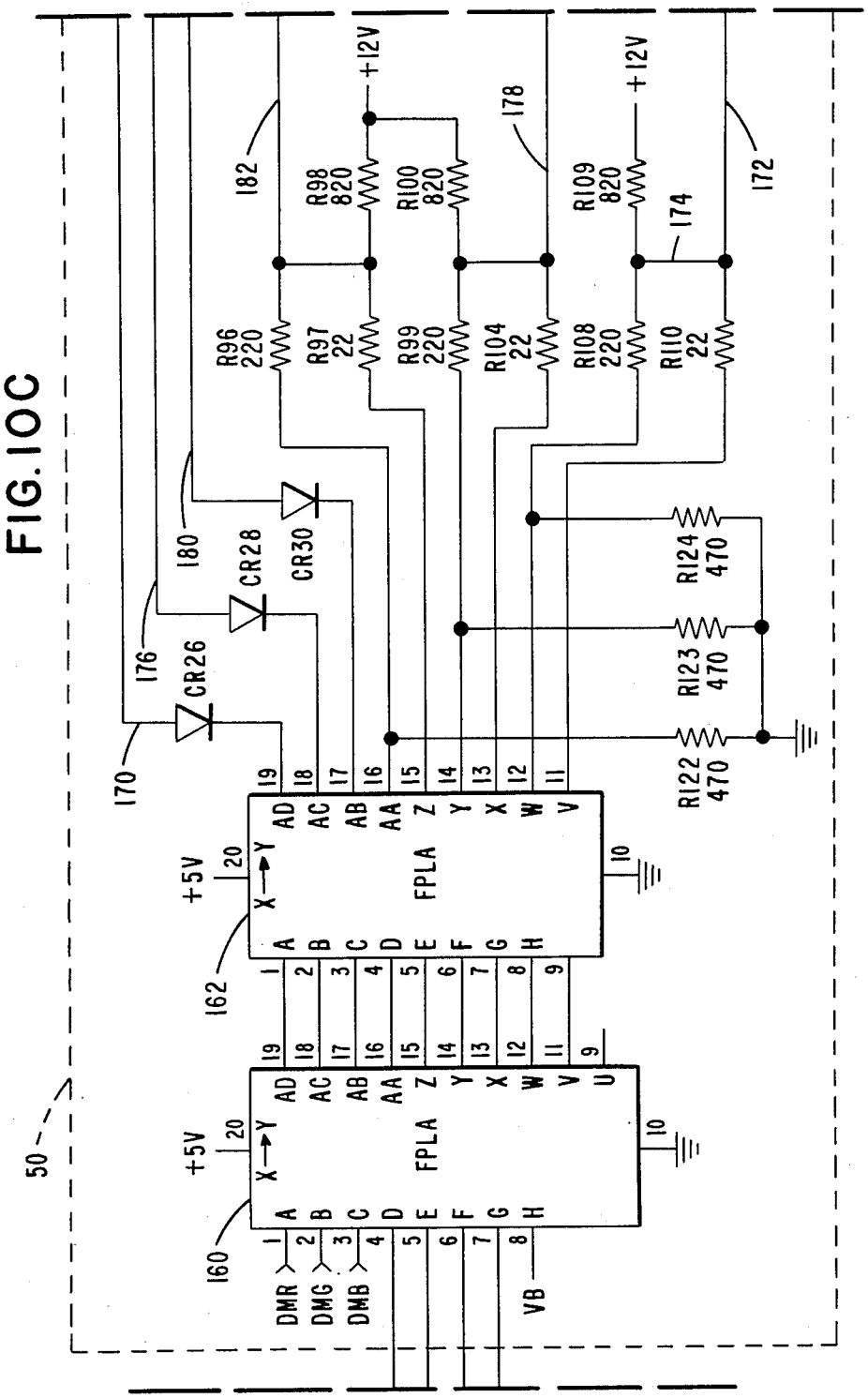
Figure 10D:
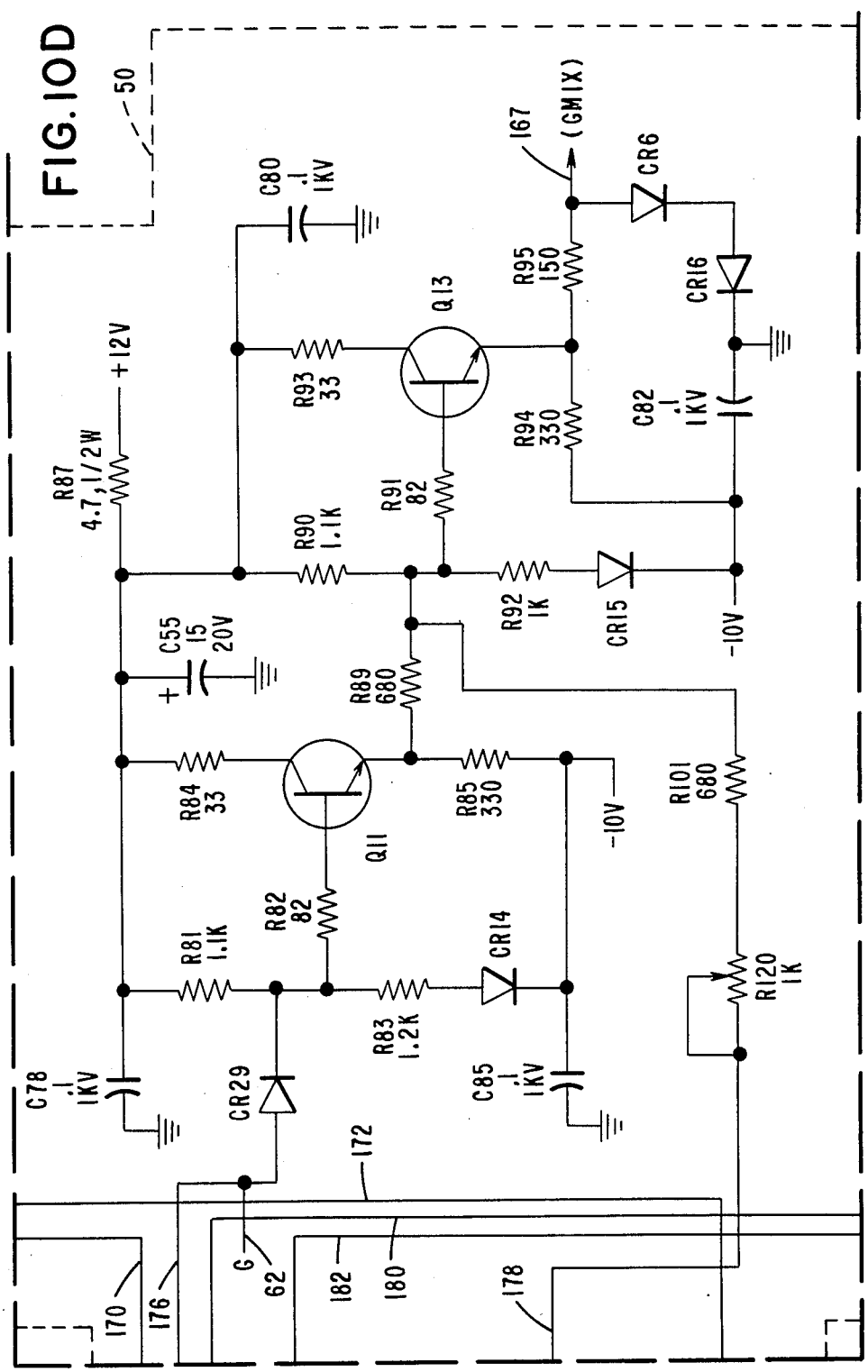
Figure 10E:
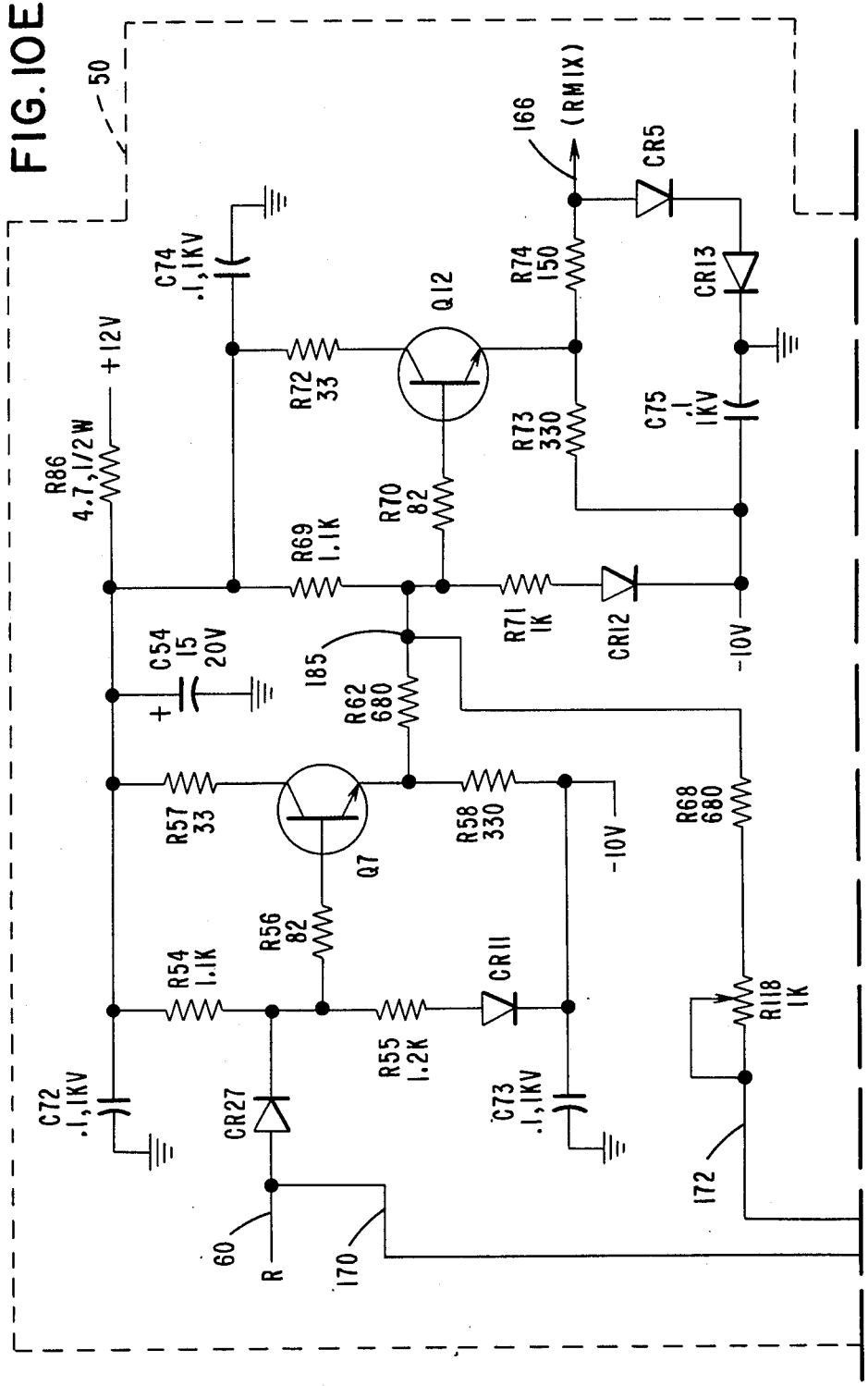
Figure 10F:
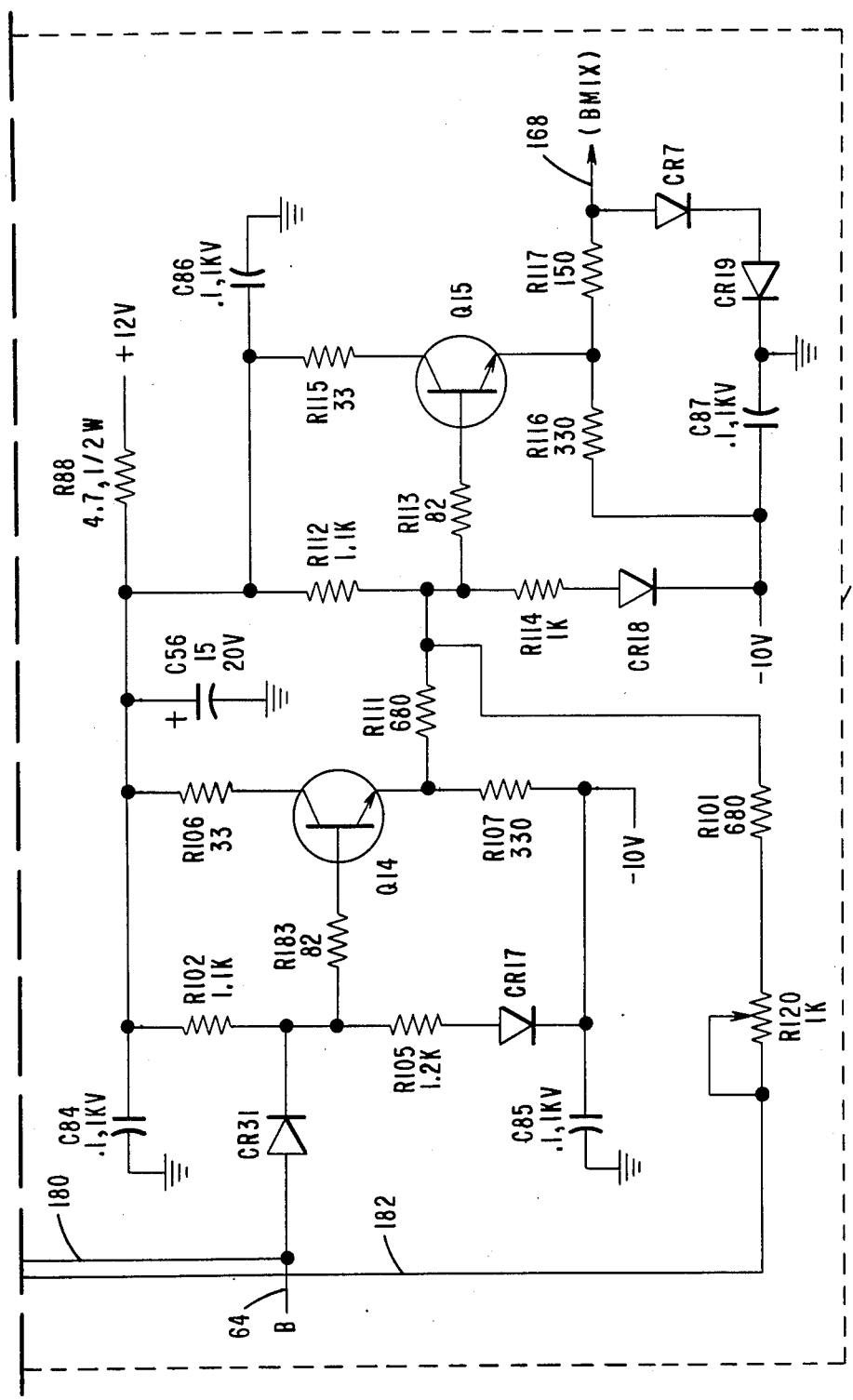

FIGS. 10D, 10E and 10F each show a mixing circuit for the same color components from the decoder circuit 56 and the CRT controller circuit 26, FIG. 10E for the red component, FIG. 10D for the green component, and FIG. 10F for the blue component. The output line for FIG. 10E is line 166 (also shown in FIG. 1) for feeding the mixed red (RMIX) signal from the mixer circuit 50 to the monitor 66. Likewise, the output of FIG. 10D for the mixed green (GMIX) signal is line 167, and the output of FIG. 10F for the mixed blue (BMIX) signal is line 168. Since the circuits of FIG. 10E, 10D and 10F are identical, only the circuit of FIG. 10E for the mixing of the red signals will be discussed.

The red component (R) signal from the CRT controller circuit is placed on line 60, which is connected to line 170 between diode CR 76 (see FIG. 10C) and diode CR 27 (see FIG. 10E). Diode CR26 is an IN4148 diode, and diode CR 27 is a hot carrier diode, both available from Motorola. Diode 26, which is a MBD101 diode available from Motorola, is connected between line 170 and pin 19 of FPLA 162 as shown in FIG. 10C, and acts as a clamp for the R signal on line 60.

The VB signal on pin 8 of the FPLA 160 provides video blanking when the computer is in the master mode, or when the video is blanked and the computer is in the slave mode. This signal, supplied during vertical retrace, activates the clamps of diodes CR26, CR28 and CR30. This shuts off all video information to the mixer while the CRT is in the vertical retrace, permitting the brightness of the display to be turned up without seeing video retrace lines.

Figure 2D:
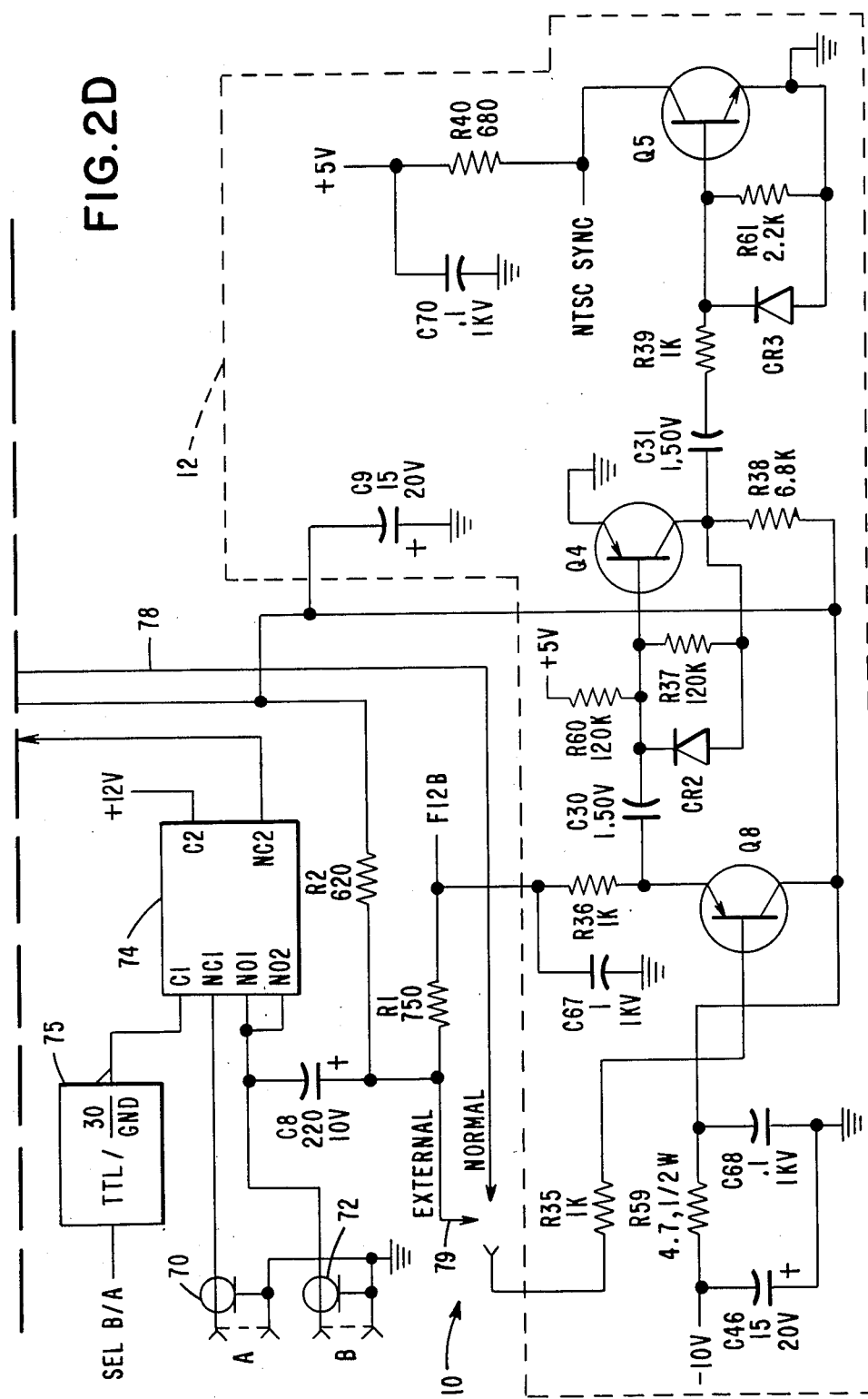

When the FLPA's 160 and 162 receives a command from the computer that either the video signal is to be blocked (such as when the system of FIG. 1 is first powered up, the video is switched between terminal 70(A) and terminal 72(B) of FIG. 2D, or the loss of sync circuit 34 detects that the video is lost) or that the mixer circuit 50 is to be operated in the replace mode, then pin 19 of FPLA 162 is grounded at the proper times, as programmed by Tables 4 and 5, to clamp the R signal on conductor 60 to ground.

In the case where the video is to be blanked, the VBLK signal is made low by the computer 38, thereby unconditionally blanking the video signal from the decoder circuit 56 until the computer 38 unblanks the video by raising the VBLK signal to a high. In this way, the computer 38 may command that the video signal be blanked for a sufficient length of time to enable the phased lock loop to lock the DOT CLK signal in phase with the sync pulse stripped from the video signal, as described.

In the case where the mixer circuit 50 is operated in the replace mode, the REP/ADD and VBLK signals are raised. This instructs the FPLA's 160 and 162 to clamp the color component signals from the decoder circuit 56 whenever any computer graphics color component signal appears from the CRT controller circuit 26. When all of the computer graphics inputs are simultaneously low, the clamps provided by diodes CR26, CR28 and CR30 are released and the video information from decoder 56 is permitted through the mixer circuit 50. This provides a replacement mode for the computer graphics information, as only the computer graphics information is displayed on the screen during the instant that the computer graphics information is present, otherwise the video signal is displayed.

When BLK/EN is low, and VB is high, the output of pin 11, FPLA 160 follows the red signal regardless of the state of the REP/ADD and VBLK signals. Pin 11 of FPLA 160 is connected to pin 9 of FPLA 162, where its state determines the output state of pin 11 of FPLA 162. Internal to FPLA 162 is a tri-state buffer which has its input permanently attached to ground. The signal on pin 9 of FPLA 162 determines when the driver of the tri-state buffer is enabled or disabled. When pin 9 of FPLA 162 is low, the driver is enabled, and the voltage on pin 11 of the FPLA 162 is pulled to ground. The voltage at the junction 174 of resistors R109 and R110 is then fed to the red mixer circuit of FIG. 10E over conductor 172. When pin 9 of FPLA 162 is high, the tri-state driver is disabled and the output on pin 11 of FPLA 162 is determined by the divider made up of resistors R108, R109, R110 and R124.

When H/F is high indicating half intensity of the computer graphics signal, the voltage on pin 12 of the FPLA 162 is additionally pulled to ground. Thus, when pin 11 of FPLA 162 is disabled as described, the upper excursion of the output voltage on conductor 172 is limited. The ratio of this excursion to that permitted when the junction of resistors R108 and R124 is not shorted to ground provides a half intensity function of the computer graphics signal that is not normally available on the computer. By choosing other ratios of resistors, different intensities for the computer information can be achieved.

If the BLK/EN signal is high while the REP/ADD and VBLK signals are high, a special replace mode operation will be entered. Since the BLK/EN signal is driven high, the computer graphics output signals will always be clamped to zero, but the replace function will still operate since the red (DMR) green (DMG) or blue (DMB) signals will be available as inputs. This will cause the appearance of black letters on a video background since during the period the video signal input to the mixer circuits of FIGS. 10D, 10E and 10F is clamped to zero by the computer inputs, the computer graphics input to these mixers will also be zero.

Similar lines and associated circuit elements are provided for the green (lines 176 and 178) and blue (lines 180 and 182) mixer circuits.

Turning now to the mixer circuit of FIG. 10E for the red components, the R signal from the decoder circuit 56, when not otherwise blanked, is buffered by the amplifier which includes transistor Q7, which is an 2N2222A NPN transistor, and diode CR11, which is an IN4148 diode available from Motorola.

As previously discussed, red computer graphics information is supplied by the voltage on junction 174 of resistors R108, R109 and R110. This voltage is fed over conductor 172 through the potentiometer R118. An algebraic mixer is formed by the resistor network of resistors R62 and R68 along with the equivalent input impedance of the output amplifier transistor Q12. Transistor Q12 is an 2N2222A NPN transistor.

The analog equivalent of the algebraic sum of the two voltages is available at the output of the buffer amplifier formed by transistor Q12. The summing impedances are chosen such that a porportional balance can be performed by the potentiometer R118. As the potentiometer R118 is varied, the amount of both the red video signal and the amount of the red computer graphics signal is varied inversely with respect to each other. As the amount of red computer graphics signal in the output is increased by decreasing the value of potentiometer R118, the impedance of the circuit is changed in such a manner as to decrease the amount of red video signal.

The potentiometer R118 is normally set in such a manner that the amount of signal contributed from each source is equal. The output of the buffer amplifier of transistor Q12 is normally 1.0 volts with either a full amplitude video or a full amplitude computer graphics signal applied to its base. If an algebraically summed signal of both video and computer information is supplied to the base of transistor Q12, its output voltage is limited to a total excursion of 1.4 volts by the threshold voltage of the diode pair CR5 and CR13. This voltage level is within the 140% deviation from maximum white level for special purpose applications set by the NTSC broadcast standards.

A translucency effect in the add mode is provided when the algebraic sum of the combined signals is less than 1.4 volts. This provides for a lessening of the intensity of the displayed signals at the point of overlap, with the displayed signals which have a voltage sum of greater than 1.4 volts being limited such that their sum is displayed at 1.4 volts. A veiling effect is provided since, in a normal video signal, signficant portions of the total will be less than 50% of the total excursion permitted. This results in the portion of the display being overlaid to appear darker than the color of the overlaying display, thus causing the overlaid image to appear within the color veil of the overlaying image.

Diodes CR5, CR12 and CR13 of FIG. 10E are IN4148 diodes from Motorola.

Thus, a system has been described which meets the aforementioned objects. It will be understood by those skilled in the art that the disclosed embodiment is exemplary only, and that the various elements disclosed may be replaced by equivalents without departing from the invention hereof, which equivalents are intended to be covered by the appended claims.

What is claimed is:

1. In a system for overlaying a computer display on a video signal, an apparatus comprising:
   video signal receiving means for receiving a video signal;
   a sync strip circuit connected to said video signal receiving means for stripping the sync pulses from said video signal;
   a clock means for generating clock pulses;
   phase locked loop means for locking the clock pulses of said clock means in phase with sync pulses stipped from the video signal when the video signal is present, and for controlling said clock means to generate clock pulses at a selected rate when the video signal is absent;
   vertical sync pulse generating means in said phase locked loop means connected to said sync strip circuit and said clock means for generating vertical sync pulses in phase with selected ones of the sync pulses stripped from the video signal when the video signal is present, and for generating vertical sync pulses after a set number of generated clock pulses when the video signal is absent;
   computer display generator means connected to said clock means and said vertical sync pulse generating means, said computer display generator means for generating computer display signals under the control of said clock pulses;
   combining means connected to said video signal receiving means and said computer display generator means for combining the video signal with the generated computer display signals when the video signal is present, and for blocking the subsequent combining of later received video signals with the generated computer display signals when the video signal is absent; and
   video display means connected to said combining means and said vertical sync pulse generating means for displaying the output of said combining means controlled by vertical sync pulses from said vertical sync pulse generating means.

2. The apparatus of claim 1 wherein said computer display generator means further comprising:
   blanking means connected to said combining means and responsive to the loss of the video signal for continuing the blocking of subsequent combining of later received video signals with the generated computer display signals for a sufficient length of time for the phase locked loop means to lock the clock pulses of said clock means in phase with sync pulses stripped from the later received video signal.

3. The apparatus of claim 1 wherein said vertical sync pulse generating means includes a counter which is reset by each of the selected ones of the sync pulses received from said sync strip circuit; said counter counting the generated clock pulses and generating a vertical sync pulse after a set count when the counter is not otherwise reset.

4. An apparatus for the simultaneous presentation of a video signal and a computer generated graphics signal comprising:
   video monitor means;
   video input means for receiving a video signal including video sync pulses;
   computer graphics means for generating a computer graphics signal for simultaneous display on said video monitor means with the video signal received by said video input means;
   sync pulse generating means for generating sync pulses for use by said video monitor means;
   phase locked loop means for locking the sync pulses of said sync pulse generating means in phase with the video sync pulses of the video signal;
   detector means for detecting the loss of receipt of the video signal by said video input means; and
   clamping means connected between said phase locked loop means and said detector means for clamping the sync pulses of said sync pulse generating means at a set rate upon the detection of the loss of receipt of the video signal by said detector means; said computer graphics means comprising means connected to said detector means and said clamping means for maintaining the clamping of said clamping means for a set time after the video signal receipt is reestablished by said video input means whereby said phase locked loop means may lock the sync pulses of the sync pulse generating means in phase with the video sync pulses of the reestablished video signal.

5. The apparatus of claim 4 further comprising:
mixer means connected between said video input means and said computer graphics means for mixing the video signal and the computer graphics signal for simultaneous presentation; said video monitor means being connected to said mixer means for the presentation of the mixed video signal and the computer graphics signal.

6. The apparatus of claim 5 futher comprising:
sync separator means connected to said video input means for separating vertical sync pulses from the video signal received by said video input means;
first vertical sync pulse generating means in said sync pulse generating means connected to said sync separator means for generating vertical sync pulses responsive to vertical sync pulses from said sync separator means; and
transmission means connected between said sync pulse generating means and said video monitor means for transmitting sync pulses from said sync pulse generating means to said video monitor means.

7. The apparatus of claim 6 wherein said first vertical sync pulse generating means includes compare means for generating vertical sync pulses in the event that the video signal is lost.

8. The apparatus of claim 7 in which said compare means is connected to said phase locked loop for receiving pulses therefrom, and said compare means further includes a counter for counting pulses from said phase locked loop and generating vertical sync pulses after a set number of counted pulses from the last received vertical sync pulse from said sync separator means.

9. The apparatus of claim 6 wherein said sync pulse generating means includes:
clock means responsive to said phase locked loop means and said clamping means for generating clock pulses in phase with the sync pulses stripped from said video signal when said video signal is present, and for generating clock pulses at a set rate when said video signal is not present;
second vertical sync generating means for generating vertical sync pulses responsive to said clock pulses;
a bi-directional line connected between said first vertical sync pulse generating means and said second vertical sync pulse generating means; and
said computer graphics means includes master/slave means for sending a signal to said sync pulse generating means which, when in a first state, instructs said first vertical sync pulse generating means to send vertical sync pulses over said transmission means to said video monitor means, and which, when in a second state, instructs said second vertical sync pulse generating means to send vertical sync pulses over said bi-directional line and said transmission means to said video monitor means.

10. In a system for overlaying a computer display on a video signal, an apparatus for generating vertical sync pulses comprising:
video input means for receiving a video signal including sync pulses;
separating means for separating horizontal sync pulses and vertical pulses from the sync pulses of the video signal received by said video input means;
computer graphics sync pulse generating means for generating computer graphics sync pulses in phase with the horizontal sync pulses of said separating means when a video signal is received by said video input means, and for generating computer graphics sync pulses at a set rate when a video signal is not received by said video input means; and
counter means for generating vertical sync pulses responsive to vertical sync pulses separated by said separating means when a video signal is received by said video input means, and for generating vertical sync pulses responsive to a set number of generated computer graphics sync pulses counted from the last vertical sync pulse from said separating means when a video signal is not received by said video input means.

11. The apparatus of claim 10 wherein said counter means is reset by each vertical sync pulse from said separating means wherein each reset restarts the counting of generated computer graphics sync pulses from said computer graphics sync pulse generating means.

12. The apparatus of claim 10 wherein said separating means includes sense detecting means to detect the polarity of the sync pulses from said video input means for detecting vertical sync pulses to be separated therefrom.

13. In a system for overlaying a computer display on a video signal, a method comprising:
receiving a video signal;
stripping the sync pulses from said video signal;
generating display control pulses;
locking said display control pulses in phase with sync pulses stripped from the video signal when the video signal is present, and generating display control pulses at a selected rate when the video signal is absent;
generating vertical drive pulses in phase with selected ones of the sync pulses stripped from the video signal when the video signal is present, and generating vertical drive pulses after a set number of generated display control pulses when the video signal is absent;
generating computer display signals under the control of the display control pulses and the vertical drive pulses; and
combining the video signal with the generated computer display signals when the video signal is present, and blocking the subsequent combining of later received video signals with the generated computer display signals when the video signal is absent.

14. The method of claim 13 further comprising:
continuing the blocking of subsequent combining of later received video signals with the generated computer display signals for a sufficient length of time to allow locking of the display control pulses of said display control means in phase with sync pulses stripped from the later received video signal.

15. A method for the simultaneous presentation of a video signal and a computer generated graphics signal comprising:
receiving a video signal including video sync pulses;
generating a computer graphics signal, including sync pulses, for simultaneous display with the received video signal;

locking the generated sync pulses in phase with the video sync pulses of the video signal;

detecting the loss of receipt of the video signal;

clamping the sync pulses of the computer graphics signal at a set rate upon the detection of the loss of receipt of the video signal;

maintaining the clamping of said clamping means for a set time after the video signal receipt is reestablished; and locking the sync pulses of the computer graphics signal in phase with the video sync pulses of the reestablished video signal.

16. The method of claim 15 further comprising:

mixing the video signal and the computer graphics signal for simultaneous presentation; and displaying the mixed video signal and the computer graphics signal on a video monitor.

17. The method of claim 16 further comprising:

transmitting sync pulses from said computer graphics signal to said video monitor;

separating vertical sync pulses from the received video signal;

generating vertical sync pulses responsive to the separated vertical sync pulses; and transmitting the generated vertical sync pulses to said video monitor.

18. The method of claim 17 further comprising:

counting sync pulses of the computer graphics signal; and, when the video signal is lost, generating vertical sync pulses after a set number of computer graphics signal sync pulses counted from the last received vertical sync pulse from said received video signal.

19. In a system for overlaying a computer display on a video signal, a method for generating vertical sync pulses comprising:

receiving a video signal including sync pulses;

separating horizontal sync pulses and vertical pulses from the received video signal;

generating computer graphics sync pulses in phase with the separated horizontal sync pulses when a video signal is received, and generating computer graphics sync pulses at a set rate when a video signal is not received; and generating vertical sync pulses responsive to vertical sync pulses separated from the stripped sync pulses when the video signal is received, and generating vertical sync pulses responsive to a set number of generated computer graphics sync pulses counted from the last separated vertical sync pulse when a video signal is not received.

* * * * *